(12) United States Patent
Endo

(10) Patent No.: US 11,869,273 B2
(45) Date of Patent: Jan. 9, 2024

(54) OBJECT RECOGNITION WITH REMOVAL OF EVENT AS NOISE WHEN THE EVENT IS DETECTED FOR A GROUP OF PIXELS EXCEEDING A THRESHOLD

(71) Applicant: Sony Group Corporation, Tokyo (JP)

(72) Inventor: Kenta Endo, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/771,217

(22) PCT Filed: Aug. 4, 2020

(86) PCT No.: PCT/JP2020/029804
§ 371 (c)(1),
(2) Date: Apr. 22, 2022

(87) PCT Pub. No.: WO2021/084833
PCT Pub. Date: May 6, 2021

(65) Prior Publication Data
US 2022/0375256 A1  Nov. 24, 2022

(30) Foreign Application Priority Data

Oct. 30, 2019  (JP) ................................ 2019-197053

(51) Int. Cl.
*G06V 40/16* (2022.01)
*G01J 1/42* (2006.01)
(Continued)

(52) U.S. Cl.
CPC .............. *G06V 40/166* (2022.01); *G01J 1/42* (2013.01); *G01S 13/08* (2013.01); *G06V 40/169* (2022.01);
(Continued)

(58) Field of Classification Search
CPC .. G06V 40/166; G06V 40/169; G06V 40/172; H04N 23/76; H04N 23/56; H04N 23/71; G01S 13/08
See application file for complete search history.

(56) References Cited

U.S. PATENT DOCUMENTS 9,934,557 B2 *  4/2018  Ji ........................... G06F 3/0304
2016/0248971 A1 *  8/2016  Tall ....................... G06V 10/141
(Continued)

FOREIGN PATENT DOCUMENTS

| EP | 2887009 A1 | 6/2015 |
| JP | 2014-165787 A | 9/2014 |
| WO | 2019/135411 A1 | 7/2019 |

OTHER PUBLICATIONS

International Search Report (PCT/ISA/210), International Application No. PCT/JP2020/029804, dated Nov. 10, 2020.
(Continued)

*Primary Examiner* — James T Boylan
(74) *Attorney, Agent, or Firm* — Michael Best & Friedrich LLP

(57) ABSTRACT

An object recognition system of the present disclosure includes: a light source section that irradiates a subject with dot light having a predetermined pattern; an event detection sensor that receives the dot light having the predetermined pattern reflected by the subject and detects, as an event, that a change in luminance of a pixel exceeds a predetermined threshold; and a signal processor that performs, in a case where a plurality of successive pixels in a pixel array section of the event detection sensor detects occurrence of an event in a certain period, processing of removing the event as noise, the plurality of successive pixels being equal to or greater than a predetermined number of pixels.

19 Claims, 19 Drawing Sheets

(51) Int. Cl.
*G01S 13/08* (2006.01)
*H04N 23/56* (2023.01)
*H04N 23/71* (2023.01)
*H04N 23/76* (2023.01)

(52) U.S. Cl.
CPC ........... *G06V 40/172* (2022.01); *H04N 23/56* (2023.01); *H04N 23/71* (2023.01); *H04N 23/76* (2023.01)

(56) References Cited

U.S. PATENT DOCUMENTS

| | | | |
|---|---|---|---|
| 2018/0268458 A1* | 9/2018 | Popa | G06V 40/169 |
| 2018/0314911 A1* | 11/2018 | Eldar | G06T 7/11 |
| 2019/0045173 A1* | 2/2019 | Hicks | G01B 11/2545 |
| 2020/0029033 A1* | 1/2020 | Xu | H04N 25/76 |
| 2021/0044744 A1* | 2/2021 | Sironi | H04N 25/47 |
| 2021/0334992 A1* | 10/2021 | Nistico | G01B 11/2513 |
| 2022/0036565 A1* | 2/2022 | Varadarajan | G06T 7/0002 |
| 2022/0129066 A1* | 4/2022 | Zahnert | G02B 27/0179 |
| 2022/0191413 A1* | 6/2022 | Ritter | H04N 25/57 |
| 2023/0156355 A1* | 5/2023 | Kim | G06T 7/136 |
| | | | 348/135 |

OTHER PUBLICATIONS

Leroux T et al: "Event-Based Structured Light for Depth Reconstruction using Frequency Tagged Light Patterns",arxiv.org, Cornell University Library, 201 Olin Library Cornell University Ithaca, NY14853,Nov. 27, 2018 (Nov. 27, 2018),XP080939284,* the whole document*.

* cited by examiner

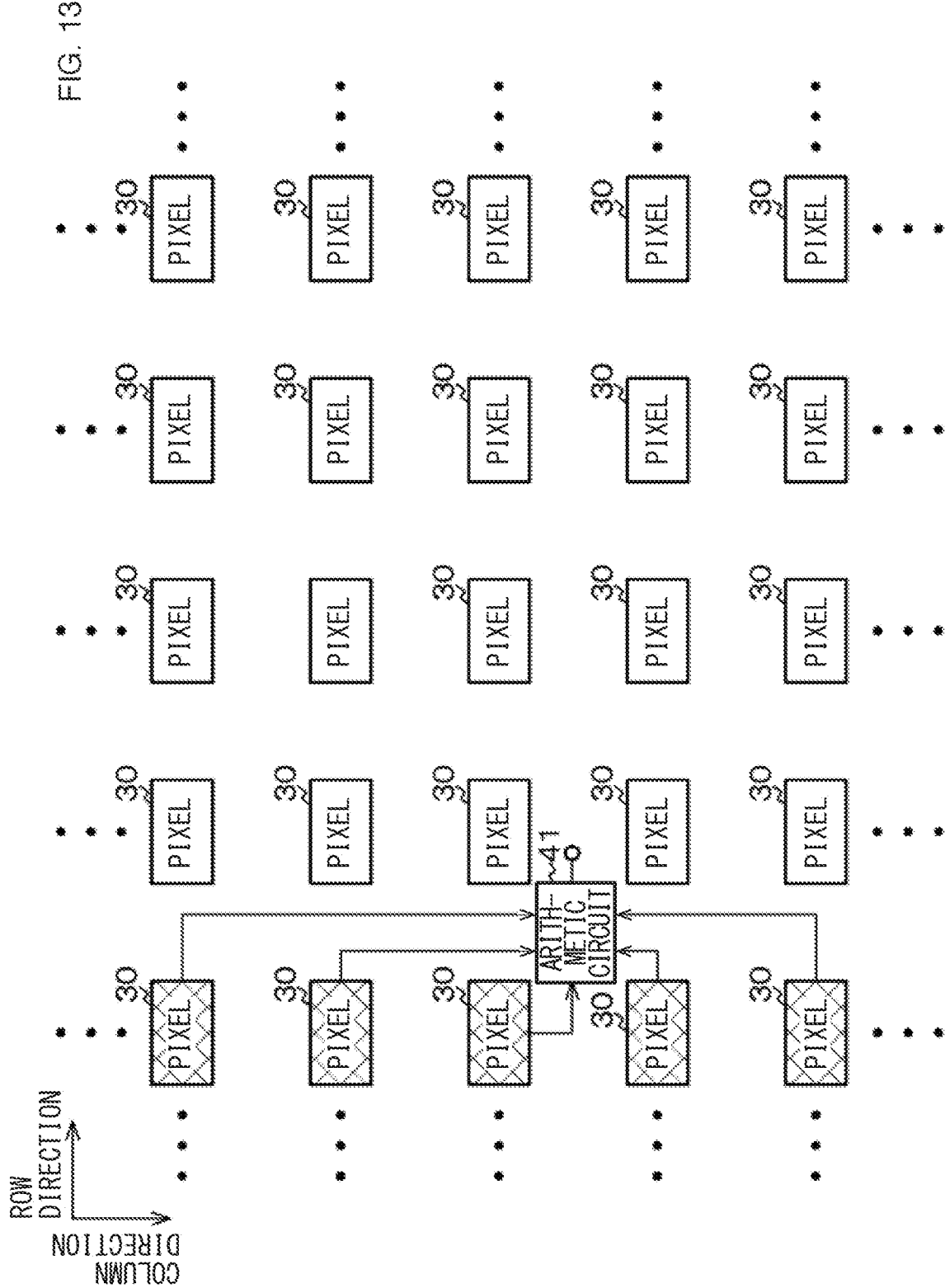

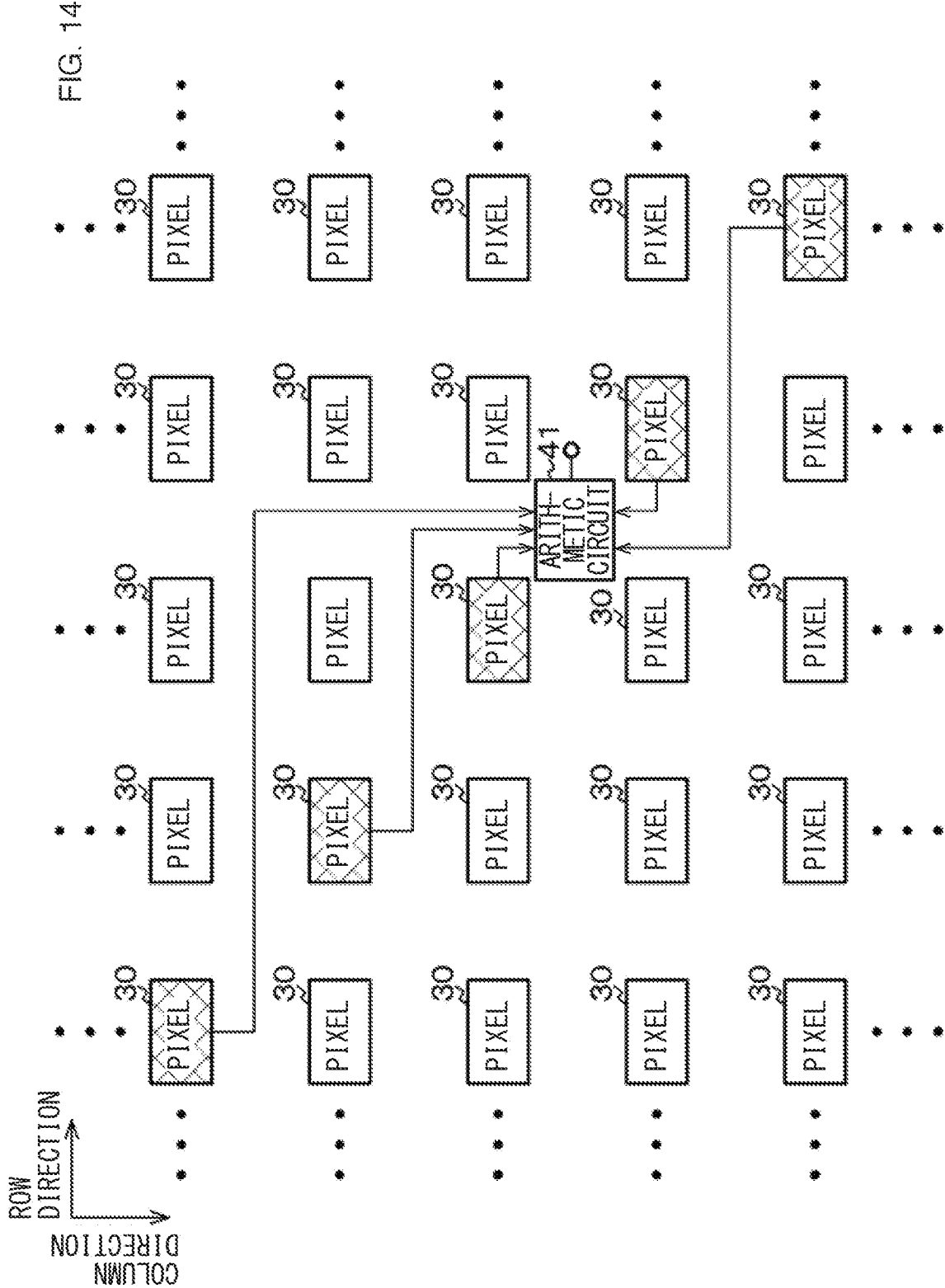

OBJECT RECOGNITION WITH REMOVAL OF EVENT AS NOISE WHEN THE EVENT IS DETECTED FOR A GROUP OF PIXELS EXCEEDING A THRESHOLD

TECHNICAL FIELD

The present disclosure relates to an object recognition system, a signal processing method of an object recognition system, and an electronic apparatus.

BACKGROUND ART

A technology of a structured light scheme that uses a dynamic projector and a dynamic vision camera has been proposed as a system for acquiring a three-dimensional (3D) image (information about a depth of a surface of an object/depth information) and measuring a distance to a subject (see PTL 1, for example). In the structured light scheme, dot light having a predetermined pattern is projected onto a measurement target/subject from the dynamic projector and depth information/distance information is acquired by analyzing a degree of distortion of the pattern on the basis of a result of imaging by the dynamic vision camera.

PTL 1 described above discloses a technology that uses a vertical cavity surface emitting laser (VCSEL: Vertical Cavity Surface Emitting Laser) as the dynamic projector that is a light source section, and uses an event detection sensor called a DVS (Dynamic Vision Sensor) as the dynamic vision camera that is a light receiving section. The event detection sensor is a sensor detecting, as an event, that a change in luminance of a pixel that photoelectrically converts entering light exceeds a predetermined threshold.

CITATION LIST

Patent Literature

PTL 1: US 2019/0045173 A1

SUMMARY OF THE INVENTION

Problem to be Solved by the Invention

Incidentally, defects such as flare tend to occur, for example, under high illumination light such as in a case where the sun is in a background. As a result, noise may occur in a specific region or a wide region due to flare and the like. Processing is therefore necessary to remove, as a noise event, information other than event information derived from dot light having a predetermined pattern that is outputted from an event detection sensor and is applied to a subject, that is, noise resulting from flare and the like.

An object of the present disclosure is to provide an object recognition system and a signal processing method of an object recognition system that make it possible to remove noise resulting from flare and the like that occur under high illumination light and reduce a burden on later signal processing, and an electronic apparatus including the object recognition system.

Means for Solving the Problem

An object recognition system of the present disclosure to achieve the above-described object includes:
a light source section that irradiates a subject with dot light having a predetermined pattern,
an event detection sensor that receives the dot light having the predetermined pattern reflected by the subject and detects, as an event, that a change in luminance of a pixel exceeds a predetermined threshold; and
a signal processor that performs, in a case where a plurality of successive pixels in a pixel array section of the event detection sensor detects occurrence of an event in a certain period, processing of removing the event as noise, the plurality of successive pixels being equal to or greater than a predetermined number of pixels.

In addition, a signal processing method of an object recognition system of the present disclosure to achieve the above-described object, the object recognition system including:
a light source section that irradiates a subject with dot light having a predetermined pattern, and
an event detection sensor that receives the dot light having the predetermined pattern reflected by the subject and detects, as an event, that a change in luminance of a pixel exceeds a predetermined threshold,
the signal processing method including:
in signal processing of the object recognition system, performing, in a case where a plurality of successive pixels in a pixel array section of the event detection sensor detects occurrence of an event in a certain period, processing of removing the event as noise, the plurality of successive pixels being equal to or greater than a predetermined number of pixels.

Furthermore, an electronic apparatus of the present disclosure to achieve the above-described object includes an object recognition system having the above-described configuration.

BRIEF DESCRIPTION OF THE DRAWINGS

FIG. 13 is a block diagram illustrating a configuration in which five successive pixels in a column direction are regarded as a unit that detects a noise event.

FIG. 14 is a block diagram illustrating a configuration in which five successive pixels in a diagonal direction are regarded as a unit that detects a noise event.

MODES FOR CARRYING OUT THE INVENTION

Figure 1A:
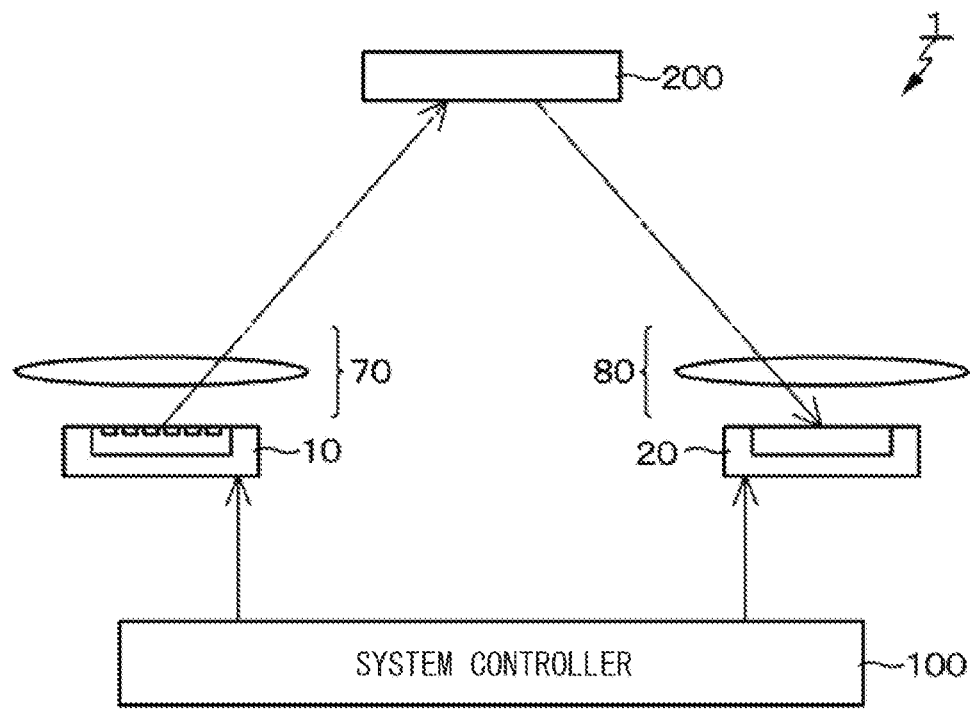
FIG. 1A is a schematic diagram illustrating an example of a system configuration of an object recognition system to which the technology according to the present disclosure is applied.

Hereinafter, modes for carrying out the technology of the present disclosure (hereinafter referred to as "embodiments") are described in detail with reference to the drawings. The technology of the present disclosure is not limited to the embodiments. In the following description, the same components, or components having the same function are denoted by the same reference signs, and redundant description is omitted. It is to be noted that description is given in the following order.

1. Overall Description of Object Recognition System and Electronic Apparatus of Present Disclosure
2. Object Recognition System to Which Technology According to Present Disclosure is Applied
   2-1. System Configuration Example
   2-2. Vertical Cavity Surface Emitting Laser (VCSEL)
   2-3. Event Detection Sensor (Arbiter System) According to First Configuration Example
      2-3-1. Configuration Example of Pixel Array Section
      2-3-2. Circuit Configuration Example of Pixel
      2-3-3. First Example of Address Event Detector
      2-3-4. Configuration Example of Current-to-voltage Converter
      2-3-5. Configuration Examples of Subtracter and Quantizer
      2-3-6. Second Configuration Example of Address Event Detector
   2-4. Event Detection Sensor (Scan System) According to Second Configuration Example
   2-5. Configuration Example of Chip Structure
   2-6. Configuration Example of Column Processor
   2-7. About Noise Event
3. Object Recognition System According to Embodiment of Present Disclosure
   3-1. Example 1 (An example in which noise resulting from flare and the like is removed as a noise event)
   3-2. Example 2 (An example in which a lower threshold and an upper threshold for detecting a true event are set)
   3-3. Example 3 (An example in which a lower threshold and an upper threshold of the number of pixels for detecting a true event are changed in accordance with a distance to a subject)
   3-4. Example 4 (A processing example for face authentication in a case of application to face authentication)
4. Modification Examples
5. Application Examples
6. Electronic Apparatus of Present Disclosure (An example of a smartphone)
7. Possible Configurations of Present Disclosure <Overall Description of Object Recognition System and Electronic Apparatus of Present Disclosure>

In an object recognition system and an electronic apparatus of the present disclosure, a plurality of pixels may be configured to include a group of successive pixels in at least one direction of a row direction, a column direction, or a diagonal direction in a pixel array section of an event detection sensor.

In the object recognition system and the electronic apparatus of the present disclosure including the preferred configuration described above, a configuration may be adopted in which assuming that in the event detection sensor, a first number of mutually adjacent pixels is a lower threshold and a second number of mutually adjacent pixels that is greater than the first number of pixels is an upper threshold, in a case where each of mutually adjacent pixels of which number is equal to or greater than the first number of pixels and equal to or less than the second number of pixels detects occurrence of an event in a certain period, a signal processor reads the event as event information derived from dot light having a predetermined pattern. In addition, in a case where pixels of which number is less than the first number of pixels detect occurrence of an event, the signal processor may be configured to remove the event as noise.

In addition, in the object recognition system and the electronic apparatus of the present disclosure including the preferred configurations described above, the signal processor may be configured to change each of a lower threshold (first number of pixels) and the upper threshold (second number of pixels) of the number of pixels in accordance with a distance to a subject. In addition, the signal processor may be configured to have a distance measurement function of measuring the distance to the subject and measure the distance to the subject by this distance measurement function, or may be configured to measure the distance to the subject with use of a proximity sensor.

In addition, in the object recognition system and the electronic apparatus of the present disclosure including the preferred configurations described above, a light source section is preferably configured to include a surface-emitting semiconductor laser, and the surface-emitting semiconductor laser is preferably configured to include a vertical cavity surface emitting laser.

In addition, the object recognition system and the electronic apparatus of the present disclosure including the preferred configurations described above may be configured to be used for face authentication in a case where the subject is a human face. Furthermore, a configuration may be adopted in which in face authentication processing, face detection at a specific position is performed with use of a vertical cavity surface emitting laser as the light source section and the event detection sensor, recognition processing of a feature of the detected face is then performed, shape recognition of the recognized face is then performed, and authentication processing of the face of which the shape has been recognized is finally performed.

<Object Recognition System to which Technology According to Present Disclosure is Applied>

An object recognition system to which the technology according to the present disclosure is applied includes an assembly of point light sources, includes a combination of a light source section that enables control of light emission/non-light emission in point light source units and an event detection sensor that detects an event, and uses a technology of a structured light scheme. Furthermore, the object recognition system to which the technology according to the present disclosure is applied has a function of acquiring a three-dimensional (3D) image and a function of measuring a distance to a subject. In the structured light scheme, coordinates of a point image (spot light) and from which point light source the point image has been projected are identified by pattern matching to thereby acquire a three-dimensional image.

The object recognition system to which the technology according to the present disclosure is applied has the function of acquiring a three-dimensional image, and may be therefore referred to as a three-dimensional image acquiring system. The object recognition system to which the technology according to the present disclosure is applied has the function of measuring a distance to a subject, and may be therefore referred to as a distance measurement system. In addition, the object recognition system to which the technology according to the present disclosure is applied also enables face authentication in a case where the subject is, for example, a human face, and may be therefore referred to as a face authentication system.

[System Configuration Example]

Figure 1B:
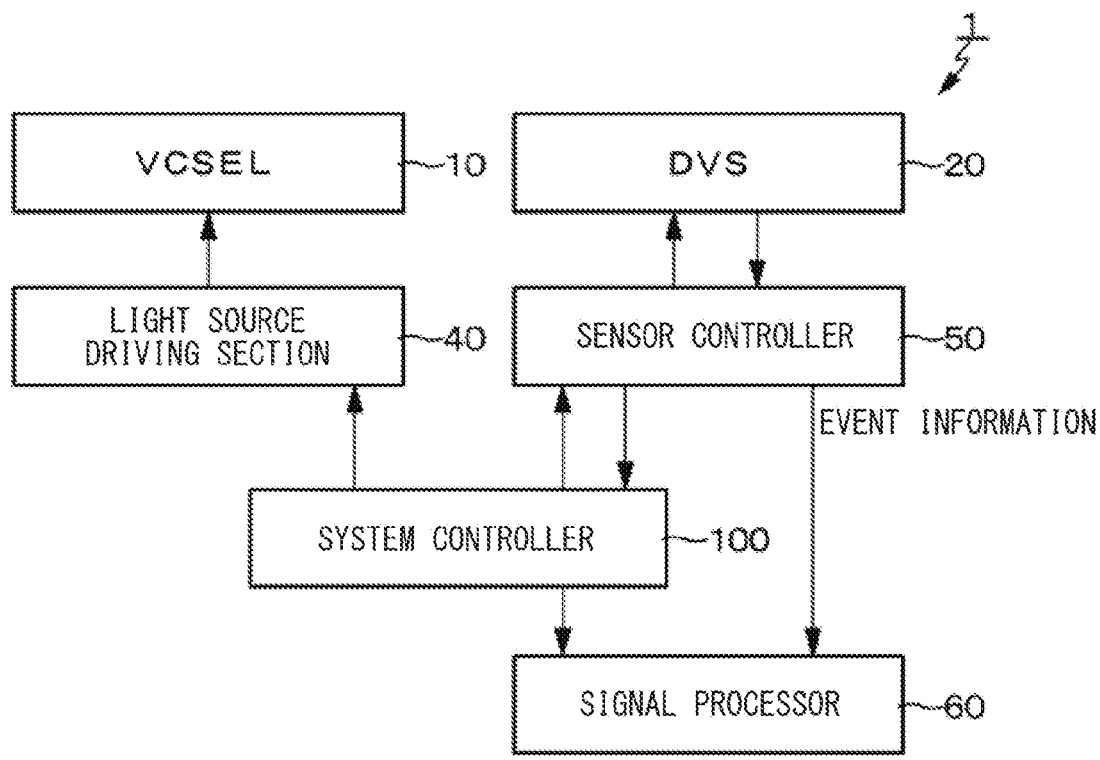
FIG. 1B is a block diagram illustrating an example of a circuit configuration of the object recognition system.

FIG. 1A is a schematic diagram illustrating an example of a system configuration of the object recognition system to which the technology according to the present disclosure is applied, and FIG. 1B is a block diagram illustrating an example of a circuit configuration of the object recognition system.

An object recognition system 1 to which the technology according to the present disclosure is applied includes an assembly of point light sources, and uses, as a light source section that irradiates a subject with dot light having a predetermined pattern, a surface-emitting semiconductor laser, e.g., a vertical cavity surface emitting laser (VCSEL: Vertical Cavity Surface Emitting Laser) 10, and uses, as a light receiving section, an event detection sensor 20 called a DVS (Dynamic Vision Sensor). It is to be noted that examples of the light source section that irradiates the subject with the dot light having the predetermined pattern may include a general edge-emitting semiconductor laser (LD) and the like, in addition to the vertical cavity surface emitting laser (VCSEL).

The vertical cavity surface emitting laser 10 enables control of light emission/non-light emission in point light source units, and projects, for example, dot light having a predetermined pattern onto a subject 200. The event detection sensor 20 has IR (infrared) sensitivity, and receives dot light reflected by the subject 200, and detects, as an event, that a change in luminance of a pixel exceeds a predetermined threshold. The event detection sensor 20 is a sensor that is able to achieve higher speed, data saving, and low power consumption by reading only a signal of a pixel of which luminance changes.

The object recognition system 1 to which the technology according to the present disclosure is applied includes a system controller 100, a light source driving section 40, a sensor controller 50, a signal processor 60, a light source-side optical system 70, and a camera-side optical system 80, in addition to the vertical cavity surface emitting laser (VCSEL) 10 and the event detection sensor (DVS) 20. The vertical cavity surface emitting laser 10 and the event detection sensor 20 are described in detail later.

The system controller 100 includes, for example, a processor (CPU), and drives the vertical cavity surface emitting laser 10 through the light source driving section 40, and drives the event detection sensor 20 through the sensor controller 50. The system controller 100 preferably controls driving of the vertical cavity surface emitting laser 10 and the event detection sensor 20 in synchronization with each other.

[Vertical Cavity Surface Emitting Laser (VCSEL)]

Figure 2A:
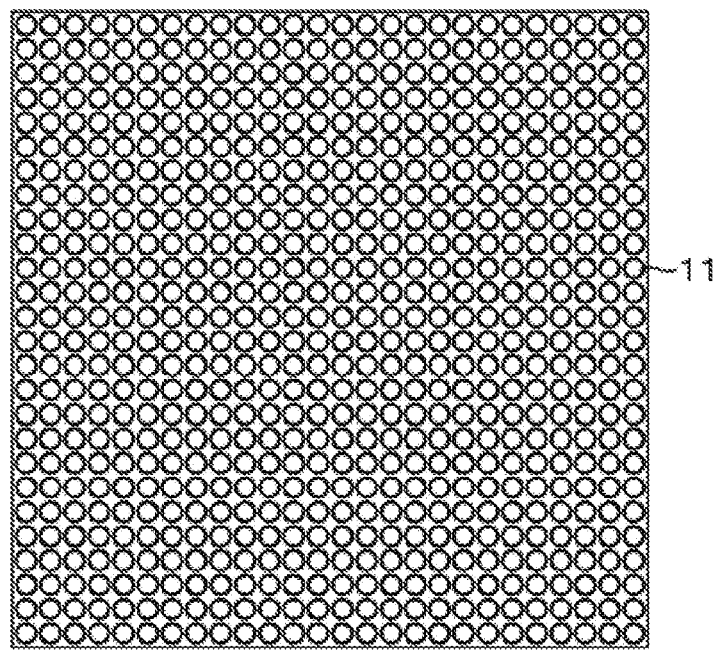
FIG. 2A is a diagram illustrating an array dot arrangement of light sources of a vertical cavity surface emitting laser in the object recognition system of the present disclosure.

Description is given of arrangement of point light sources (dots) 11 of the vertical cavity surface emitting laser 10. The object recognition system 1 to which the technology according to the present disclosure is applied employs, for arrangement of the point light sources 11 of the vertical cavity surface emitting laser 10, a so-called array dot arrangement in which, as illustrated in FIG. 2A, the point light sources 11 are two-dimensionally arranged in an array form (matrix form) with a constant pitch.

In the object recognition system 1 including a combination of the vertical cavity surface emitting laser 10 and the event detection sensor 20, from which one of the point light sources 11 the image has been projected is easily identifiable by sequentially turning on the point light sources 11 of the vertical cavity surface emitting laser 10 and referring a time stamp of an event recorded by the event detection sensor 20, that is, time information (temporal information) indicating a relative time at which the event occurred.

Figure 2B:
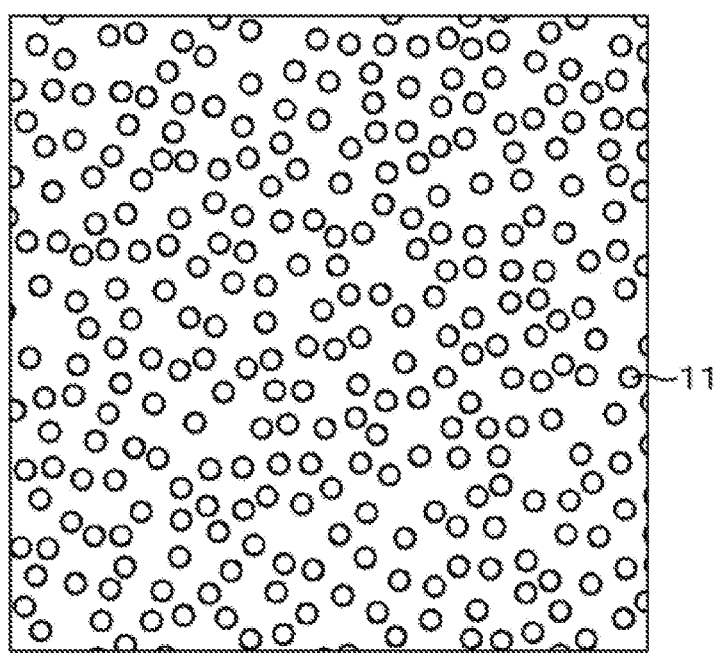
FIG. 2B is a diagram illustrating a random dot arrangement in contrast to the array dot arrangement.

In addition, in a case of the array dot arrangement, as illustrated in FIG. 2B, it is possible to increase the number of the point light sources 11 more than that in the case of a so-called random dot arrangement that includes the point light sources 11 arranged in a specific arrangement with no repetition, and has a feature in a spatial direction; therefore, there is an advantage that it is possible to increase resolution of a distance image that is determined by the number of the point light sources 11. Here, the "distance image" refers to an image for acquiring distance information to the subject.

For information, in a case of the random dot arrangement, it is difficult to increase the number of the point light sources 11 while maintaining the specificity of the arrangement pattern of the point light sources 11; therefore, it is not possible to increase resolution of the distance image that is determined by the number of the point light sources 11. However, arrangement of the point light sources 11 of the vertical cavity surface emitting laser 10 in the object recognition system 1 to which the technology according to the present disclosure is applied is not limited to the array dot arrangement, and may be the random dot arrangement.

The vertical cavity surface emitting laser 10 is a surface-emitting light source that enables control of light emission/non-light emission in units of the point light sources 11 under control by the system controller 100. This makes it possible for the vertical cavity surface emitting laser 10 not only to entirely irradiate a subject with light, but also to partially irradiate the subject with light having a desired pattern by dot irradiation in point light source units, line irradiation in pixel column units, and the like.

For information, in the structured light scheme, a subject (distance measurement object) is irradiated with light at different angles from a plurality of point light sources 11, and reflected light from the subject is read, which makes it possible to recognize the shape of the subject.

Next, description is given of the event detection sensor 20 that detects, as an event, that a change in luminance of a pixel exceeds a predetermined threshold.

[Event Detection Sensor (Arbiter System) According to First Configuration Example]

Figure 3:
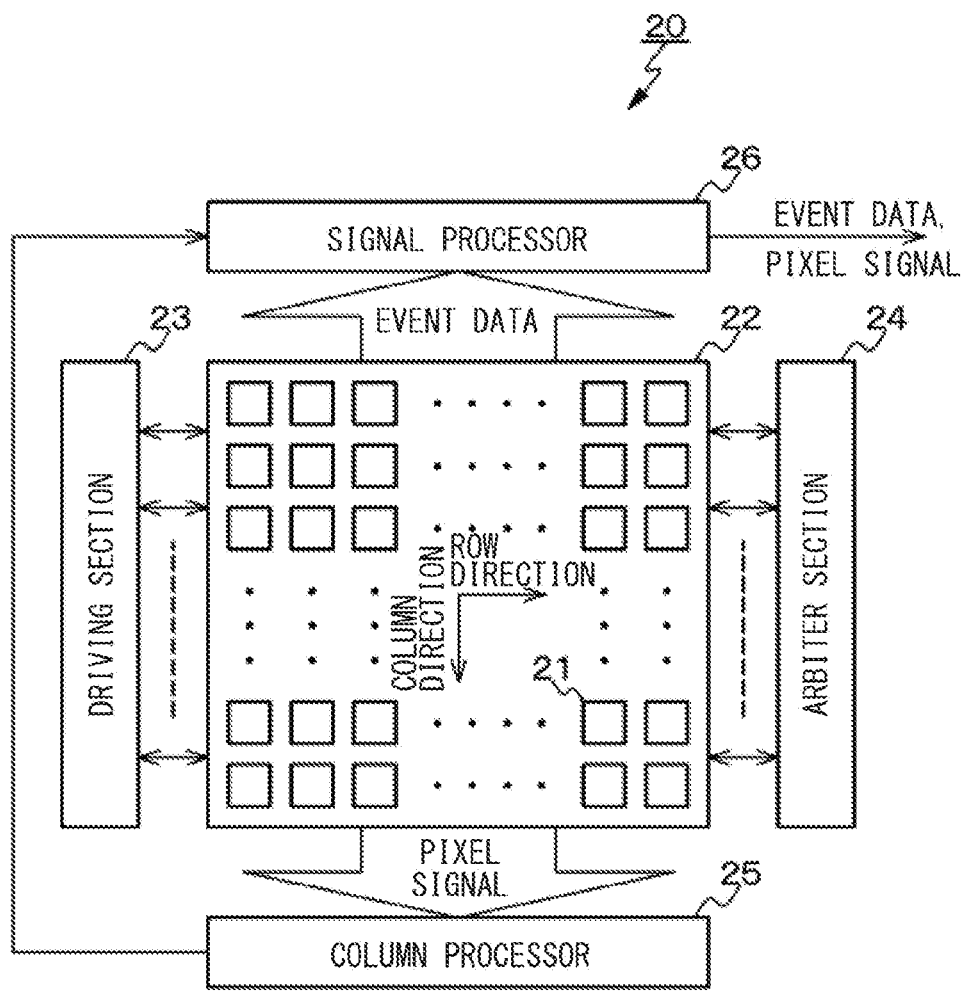
FIG. 3 is a block diagram illustrating an example of a configuration of an event detection sensor according to a first configuration example in the object recognition system to which the technology according to the present disclosure is applied.

FIG. 3 is a block diagram illustrating an example of a configuration of an event detection sensor according to a first configuration example that is usable as the event detection sensor 20 in the object recognition system 1.

As illustrated in FIG. 3, the event detection sensor 20 according to the first configuration example is an asynchronous event detection sensor called a DVS, and is configured to include a pixel array section 21, a driving section 22, an arbiter section (arbitration section) 23, a column processor 24, and a signal processor 25.

In the event detection sensor 20 having the configuration described above, the pixel array section 21 includes a plurality of pixels 30 that is two-dimensionally arranged in a matrix form (array form). A vertical signal line VSL is wired to each pixel column of such a pixel arrangement in a matrix form.

The plurality of pixels 30 each generates, as a pixel signal, an analog signal of a voltage corresponding to a photocurrent. In addition, the plurality of pixels 30 each detects the presence or absence of an address event on the basis of whether or not the amount of change of the photocurrent exceeds a predetermined threshold. Upon occurrence of the address event, the pixel 30 outputs a request to the arbiter section 23.

The driving section 22 drives each of the plurality of pixels 30 to output a pixel signal generated by each of the pixels 30 to the column processor 24.

The arbiter section 23 arbitrates a request from each of the plurality of pixels 30 and transmits, to each of the pixels 30, a response based on an arbitration result. The pixel 30 that has received the response from the arbiter section 23 supplies a detection signal (an address event detection signal) indicating a detection result to the driving section 22 and the signal processor 25. Reading of detection signals from the pixels 30 may be performed by reading from a plurality of rows.

The column processor 24 includes, for example, an analog-to-digital converter, and performs processing, for each pixel column of the pixel array section 21, to convert analog pixel signals outputted from the pixels 30 in the column into digital signals. The column processor 24 then supplies the digital signals acquired after analog-to-digital conversion to the signal processor 25.

The signal processor 25 executes predetermined signal processing such as CDS (Correlated Double Sampling) processing and image recognition processing on the digital signals supplied from the column processor 24. The signal processor 25 then supplies data indicating a processing result and detection signals supplied from the arbiter section 23 to a recording section 12 (see FIG. 1) through a signal line 14.

(Configuration Example of Pixel Array Section)

Figure 4:
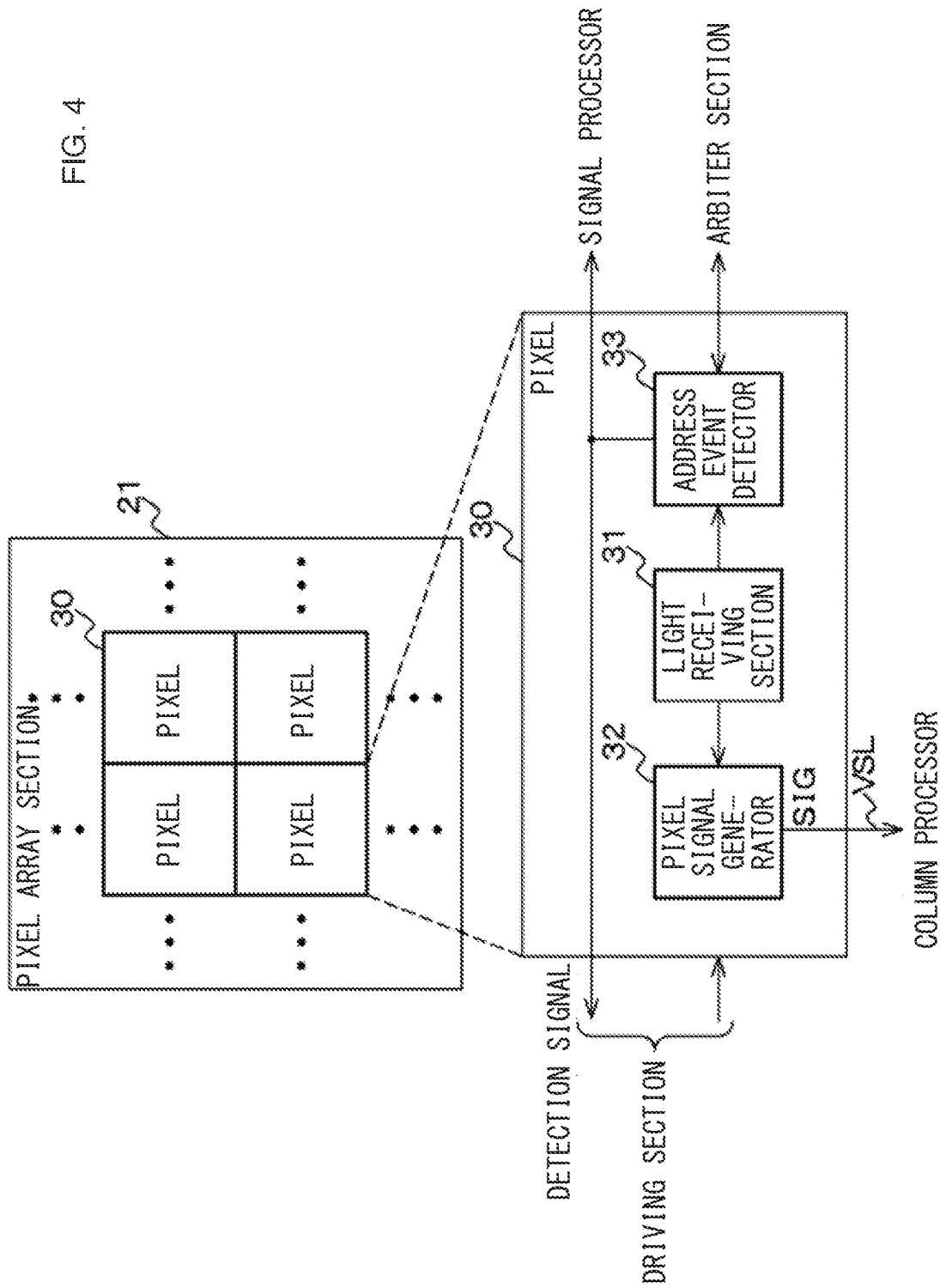
FIG. 4 is a block diagram illustrating an example of a configuration of a pixel array section in the event detection sensor according to the first configuration example.

FIG. 4 is a block diagram illustrating an example of a configuration of the pixel array section 21 in the event detection sensor 20 according to the first configuration example.

In the pixel array section 21 including the plurality of pixels 30 two-dimensionally arranged in a matrix form, each of the plurality of pixels 30 is configured to include a light receiving section 31, a pixel signal generator 32, and an address event detector 33.

In the pixel 30 having the configuration described above, the light receiving section 31 photoelectrically converts entering light to generate a photocurrent. The light receiving section 31 then supplies the photocurrent generated by photoelectric conversion to one of the pixel signal generator 32 and the address event detector 33 in accordance with control by the driving section 22 (see FIG. 3).

The pixel signal generator 32 generates, as a pixel signal SIG, a signal of a voltage corresponding to the photocurrent supplied from the light receiving section 31, and supplies the generated pixel signal SIG to the column processor 24 (see FIG. 3) through the vertical signal line VSL.

The address event detector 33 detects the presence or absence of an address event on the basis of whether or not the amount of change of the photocurrent from each light receiving section 31 exceeds a predetermined threshold. The address events include, for example, an on-event indicating that the amount of change of the photocurrent exceeds an upper threshold and an off-event indicating that the amount of change falls below a lower threshold. In addition, the address event detection signal includes one bit representing a result of detection of the on-event and one bit representing a result of detection of the off-event. It is to be noted that the address event detector 33 may also be configured to detect only the on-event.

Upon the occurrence of the address event, the address event detector 33 supplies a request for requesting transmission of the address event detection signal to the arbiter section 23 (see FIG. 3). Then, the address event detector 33 supplies the address event detection signal to the driving section 22 and the signal processor 25 upon reception of a response to the request from the arbiter section 23.

(Circuit Configuration Example of Pixel)

Figure 5:
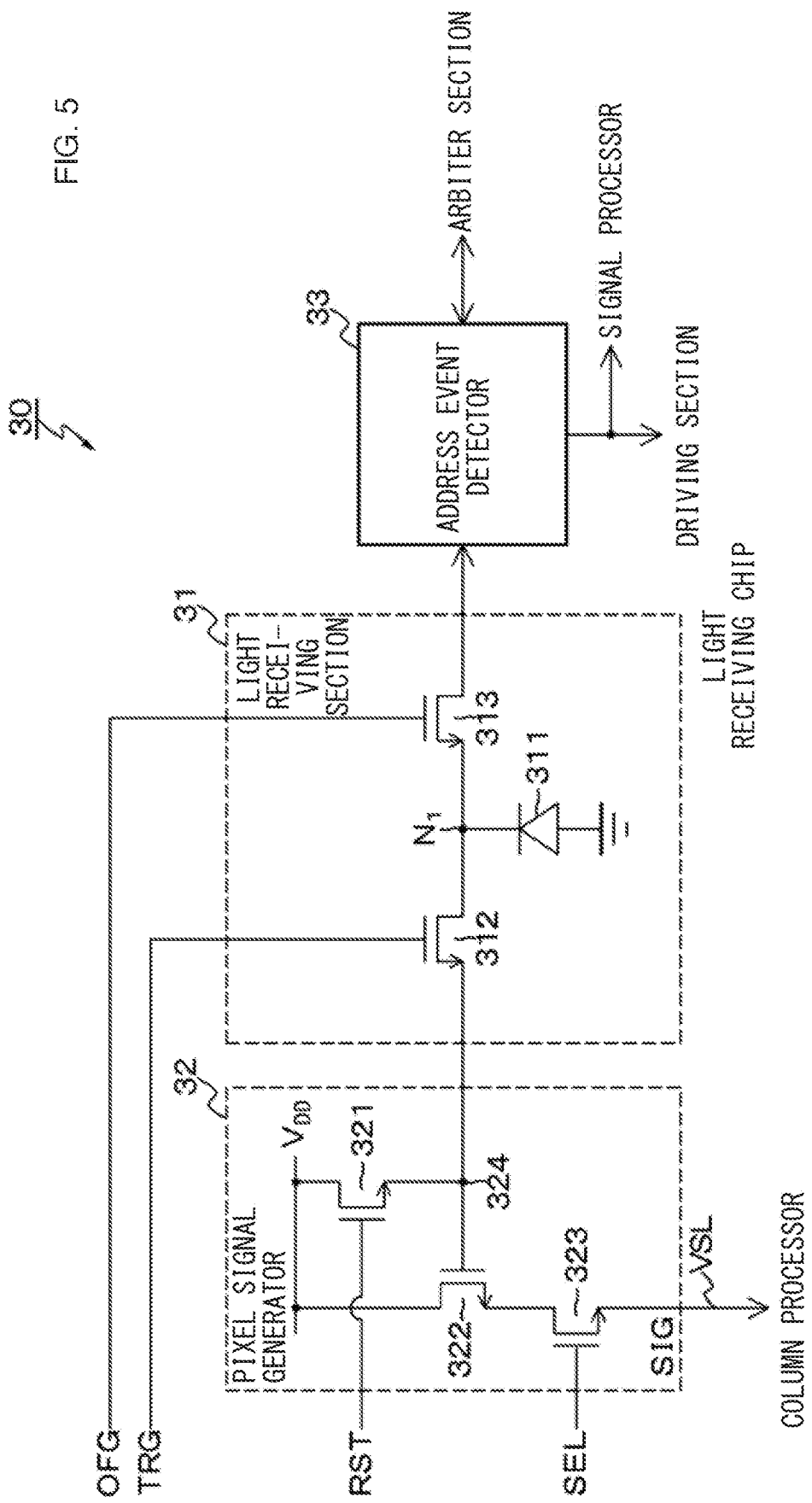
FIG. 5 is a circuit diagram illustrating an example of a circuit configuration of a pixel in the event detection sensor according to the first configuration example.

FIG. 5 is a circuit diagram illustrating an example of a circuit configuration of the pixel 30 in the event detection sensor 20 according to the first configuration example. As described above, each of the plurality of pixels 30 is configured to include the light receiving section 31, the pixel signal generator 32, and the address event detector 33.

In the pixel 30 having the configuration described above, the light receiving section 31 is configured to include a light receiving element (photoelectric converter) 311, a transfer transistor 312, and an OFG (Over Flow Gate) transistor 313. As the transfer transistor 312 and the OFG transistor 313, for example, N-type MOS (Metal Oxide Semiconductor) transistors are used. The transfer transistor 312 and the OFG transistor 313 are coupled in series to each other.

The light receiving element 311 is coupled between a common coupling node $N_1$ between the transfer transistor 312 and the OFG transistor 313, and a ground, and photoelectrically converts entering light to generate electric charge having an electric charge amount corresponding to the light amount of entering light.

A transfer signal TRG is supplied from the driving section 22 illustrated in FIG. 3 to a gate electrode of the transfer transistor 312. The transfer transistor 312 responds to the transfer signal TRG to supply electric charge generated by photoelectric conversion in the light receiving element 311 to the pixel signal generator 32.

A control signal OFG is supplied from the driving section 22 to a gate electrode of the OFG transistor 313. The OFG transistor 313 responds to the control signal OFG to supply an electric signal generated by the light receiving element 311 to the address event detector 33. The electric signal to be supplied to the address event detector 33 is a photocurrent including electric charge.

The pixel signal generator 32 is configured to include a reset transistor 321, an amplification transistor 322, a selection transistor 323, and a floating diffusion layer 324. As the reset transistor 321, the amplification transistor 322, and the selection transistor 323, for example, N-type MOS transistors are used.

Electric charge generated by photoelectric conversion in the light receiving element 311 is supplied by the transfer transistor 312 from the light receiving section 31 to the pixel signal generator 32. The electric charge supplied from the light receiving section 31 is accumulated in the floating diffusion layer 324. The floating diffusion layer 324 generates a voltage signal of a voltage value corresponding to the amount of accumulated electric charge. That is, the floating diffusion layer 324 converts the electric charge into a voltage.

The reset transistor 321 is coupled between a power supply line of a power supply voltage VDD and the floating diffusion layer 324. A reset signal RST is supplied from the driving section 22 to a gate electrode of the reset transistor 321. The reset transistor 321 responds to the reset signal RST to initialize (reset) the electric charge amount of the floating diffusion layer 324.

The amplification transistor 322 is coupled in series to the selection transistor 323 between the power supply line of the power supply voltage VDD and the vertical signal line VSL. The amplification transistor 322 amplifies the voltage signal generated by electric charge-to-voltage conversion in the floating diffusion layer 324.

A selection signal SEL is supplied from the driving section 22 to a gate electrode of the selection transistor 323. The selection transistor 323 responds to the selection signal SEL to output, as the pixel signal SIG, the voltage signal amplified by the amplification transistor 322 to the column processor 24 (see FIG. 3) through the vertical signal line VSL.

In the event detection sensor 20 according to the first configuration example including the pixel array section 21 that includes the two-dimensionally arranged pixels 30 having the configuration described above, in a case where the driving section 22 is instructed by the controller 13 illustrated in FIG. 1 to start detection of an address event, the driving section 22 supplies the control signal OFG to the OFG transistor 313 of the light receiving section 31 to drive the OFG transistor 313, thereby causing the OFG transistor 313 to supply a photocurrent to the address event detector 33.

Then, in a case where an address event is detected in a certain pixel 30, the driving section 22 turns off the OFG transistor 313 of the certain pixel 30 to stop supply of the photocurrent to the address event detector 33. Next, the driving section 22 supplies the transfer signal TRG to the transfer transistor 312 to drive the transfer transistor 312, thereby causing the transfer transistor 312 to transfer electric charge generated by photoelectric conversion in the light receiving element 311 to the floating diffusion layer 324.

Thus, the event detection sensor 20 according to the first configuration example including the pixel array section 21 that includes the two-dimensionally arranged pixels having the configuration described above outputs only a pixel signal of the pixel 30 in which an address event has been detected to the column processor 24. This makes it possible to reduce power consumption of the event detection sensor 20 and the processing amount of image processing irrespective of the presence or absence of the address event, as compared with a case where the pixel signals of all pixels are outputted.

It is to be noted that the configuration of the pixel 30 exemplified here is only an example, and the configuration of the pixel 30 is not limited thereto. For example, a pixel configuration not including the pixel signal generator 32 may be adopted. In this pixel configuration, it is sufficient if the light receiving section 31 does not include the OFG transmitter 313 and the transfer transistor 312 has the function of the OFG transistor 313.

(First Configuration Example of Address Event Detector)

Figure 6:
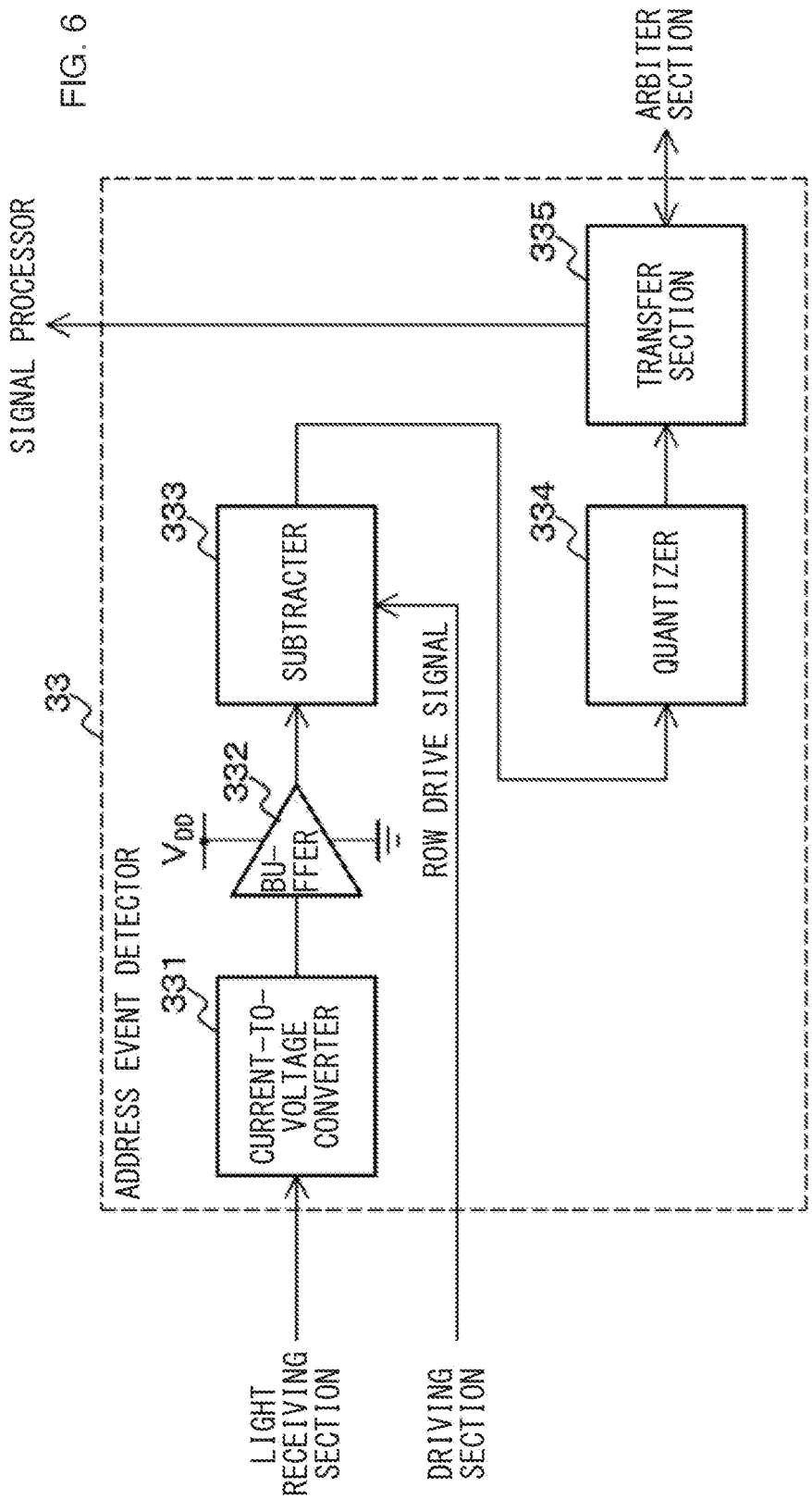
FIG. 6 is a block diagram illustrating a first configuration example of an address event detector in the event detection sensor according to the first configuration example.

FIG. 6 is a block diagram illustrating a first configuration example of the address event detector 33 in the event detection sensor 20 according to the first configuration example. As illustrated in FIG. 6, the address event detector 33 according to the present configuration example is configured to include a current-to-voltage converter 331, a buffer 332, a subtracter 333, a quantizer 334, and a transfer section 335.

The current-to-voltage converter 331 converts a photocurrent from the light receiving section 33 of the pixel 30 into a voltage signal that is a logarithm of the photocurrent. The current-to-voltage converter 331 supplies the voltage signal acquired by conversion to the buffer 332. The buffer 332 performs buffering of the voltage signal supplied from the current-to-voltage converter 331, and supplies to the voltage signal to the subtracter 333.

A row drive signal is supplied from the driving section 22 to the subtracter 333. The subtracter 333 decreases the level of the voltage signal supplied from the buffer 332 in accordance with the row drive signal. The subtracter 333 then supplies the voltage signal of which the level has been decreased to the quantizer 334. The quantizer 334 quantizes the voltage signal supplied from the subtracter 333 into a digital signal, and outputs the digital signal as an address event detection signal to the transfer section 335.

The transfer section 335 transfers the address event detection signal supplied from the quantizer 334 to the arbiter section 23 or the like. The transfer section 335 supplies a request for requesting transmission of the address event detection signal to the arbiter section 23 upon detection of the address event. Then, the transfer section 335 supplies the address event detection signal to the driving section 22 and the signal processor 25 upon reception of a response to the request from the arbiter section 23.

Next, description is given of configuration examples of the current-to-voltage converter 331, the subtracter 333, and the quantizer 334 in the address event detector 33.
(Configuration Example of Current-to-Voltage Converter)

Figure 7:
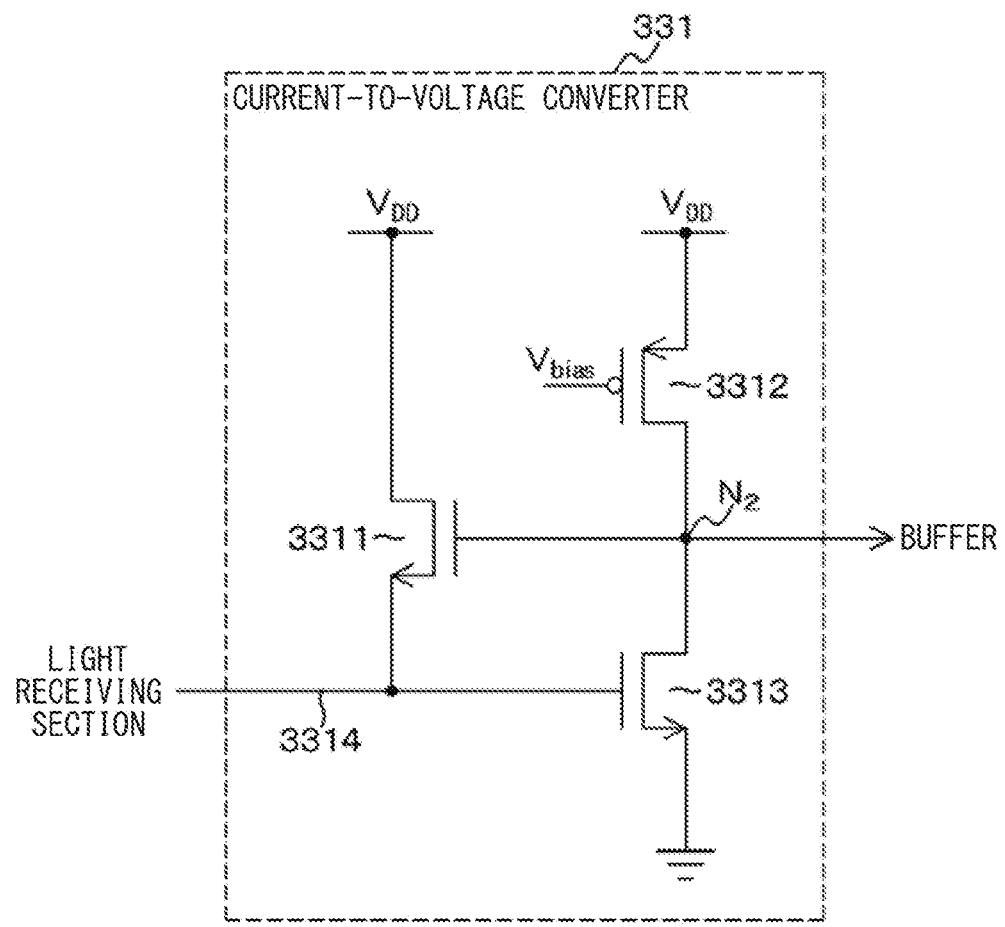
FIG. 7 is a circuit diagram illustrating an example of a configuration of a current-to-voltage converter in the address event detector according to the first configuration example.

FIG. 7 is a circuit diagram illustrating an example of a configuration of the current-to-voltage converter 331 in the address event detector 33 according to the first configuration example. As illustrated in FIG. 7, the current-to-voltage converter 331 according to the present example has a circuit configuration including an N-type transistor 3311, a P-type transistor 3312, and an N-type transistor 3313. As these transistors 3311 to 3313, for example, MOS transistors are used.

The N-type transistor 3311 is coupled between the power supply line of the power supply voltage VDD and a signal input line 3314. The P-type transistor 3312 and the N-type transistor 3313 are coupled in series to each other between the power supply line of the power supply voltage VDD and a ground. A gate electrode of the N-type transistor 3311 and an input terminal of the buffer 332 illustrated in FIG. 6 are coupled to a common coupling node $N_2$ between the P-type transistor 3312 and the N-type transistor 3313.

A predetermined bias voltage $V_{bias}$ is applied to a gate electrode of the P-type transistor 3312. This causes the P-type transistor 3312 to supply a constant current to the N-type transistor 3313. A photocurrent is inputted from the light receiving section 31 to a gate electrode of the N-type transistor 3313 through the signal input line 3314.

Drain electrodes of the N-type transistor 3311 and the N-type transistor 3313 are coupled on power supply side, and such circuits are called source-followers. The photocurrent from the light receiving section 31 is converted into a voltage signal that is a logarithm of the photocurrent by these two source-followers coupled to each other in a loop.
(Configuration Examples of Subtracter and Quantizer)

Figure 8:
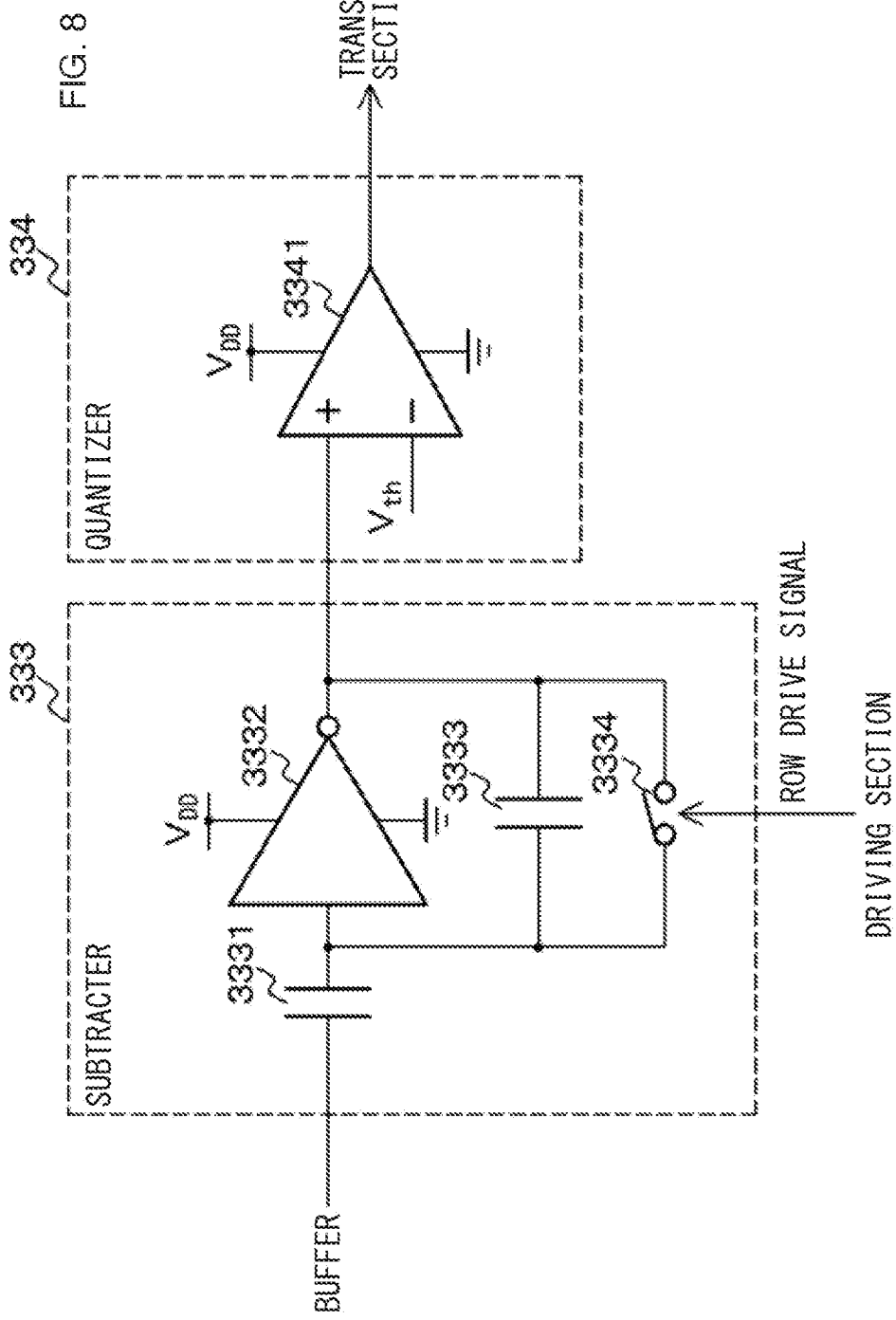
FIG. 8 is a circuit diagram illustrating an example of configurations of a subtracter and a quantizer in the address event detector according to the first configuration example.

FIG. 8 is a circuit diagram illustrating an example of configurations of the subtracter 333 and the quantizer 334 in the address event detector 33 according to the first configuration example.

The subtracter 333 according to the present example is configured to include a capacitor element 3331, an inverter circuit 3332, a capacitor element 3333, and a switch element 3334.

The capacitor element 3331 has one end coupled to an output terminal of the buffer 332 illustrated in FIG. 6, and another end coupled to an input terminal of the inverter circuit 3332. The capacitor element 3333 is coupled in parallel to the inverter circuit 3332. The switch element 3334 is coupled between both ends of the capacitor element 3333. The row drive signal is supplied as an open/close control signal from the driving section 22 to the switch element 3334. The switch element 3334 opens or closes a path coupling both ends of the capacitor element 3333 in accordance with the row drive signal. The inverter circuit 3332 inverts the polarity of a voltage signal inputted through the capacitor element 3331.

In the subtracter 333 having the configuration described above, in a case where the switch element 3334 is turned on (closed), a voltage signal $V_{init}$ is inputted to a terminal, on side of the buffer 332, of the capacitor element 3331, and a terminal on opposite side to the terminal becomes a virtual ground terminal. It is assumed that a potential at the virtual ground terminal is zero for the sake of convenience. At this time, electric charge $Q_{init}$ accumulated in the capacitor element 3331 is represented by the following expression (1), where $C_1$ is a capacitance value of the capacitor element 3331. In contrast, both ends of the capacitor element 3333 are short-circuited; therefore, accumulated electric charge thereof is zero.

$$Q_{init}=C_1 \times V_{init} \quad (1)$$

Next, in view of a case where the switch element 3334 is turned off (open) and the voltage at the terminal, on the side of the buffer 332, of the capacitor element 3331 is changed to $V_{after}$, electric charge $Q_{after}$ accumulated in the capacitor element 3331 is represented by the following expression (2).

$$Q_{after}=C_1 \times V_{after} \quad (2)$$

In contrast, electric charge $Q_2$ accumulated in the capacitor element 3333 is represented by the following expression (3), where $C_2$ is a capacitance value of the capacitor element 3333 and $V_{out}$ is an output voltage.

$$Q_2=-C_2 \times V_{out} \quad (3)$$

At this time, the total electric charge amount of the capacitor element 3331 and the capacitor element 3333 is not changed; therefore, the following expression (4) is established.

$$Q_{init}=Q_{after}+Q_2 \quad (4)$$

The following expression (5) is obtained by substituting the expressions (1) to (3) into the expression (4).

$$V_{out}=-(C_1/C_2) \times (V_{after}-V_{init}) \quad (5)$$

The expression (5) represents an operation of subtracting the voltage signal, and a gain of a subtraction result is $C_1/C_2$. In general, it is desired to maximize a gain; therefore, it is preferable that $C_1$ be designed to be large and $C_2$ be designed to be small. In contrast, in a case where $C_2$ is too small, kTC noise may be increased to deteriorate noise characteristics; therefore, capacitance reduction in $C_2$ is limited within a range where noise is acceptable. In addition, the address event detector 33 including the subtracter 333 is mounted on each pixel 30; therefore, the capacitor element 3331 and the capacitor element 3333 have restrictions on area. The capacitance values $C_1$ and $C_2$ of the capacitor elements 3331 and 3333 are determined in consideration of these matters.

In FIG. 8, the quantizer 334 is configured to include a comparator 3341. The comparator 3341 receives the output signal of the inverter circuit 3332, that is, the voltage signal from the subtracter 430 as non-inverted (+) input, and receives a predetermined threshold voltage $V_{th}$ as inverted (−) input. The comparator 3341 then compares the voltage signal from the subtracter 430 with the predetermined threshold voltage $V_{th}$, and outputs a signal indicating a comparison result as an address event detection signal to the transfer section 335.
(Second Configuration Example of Address Event Detector)

Figure 9:
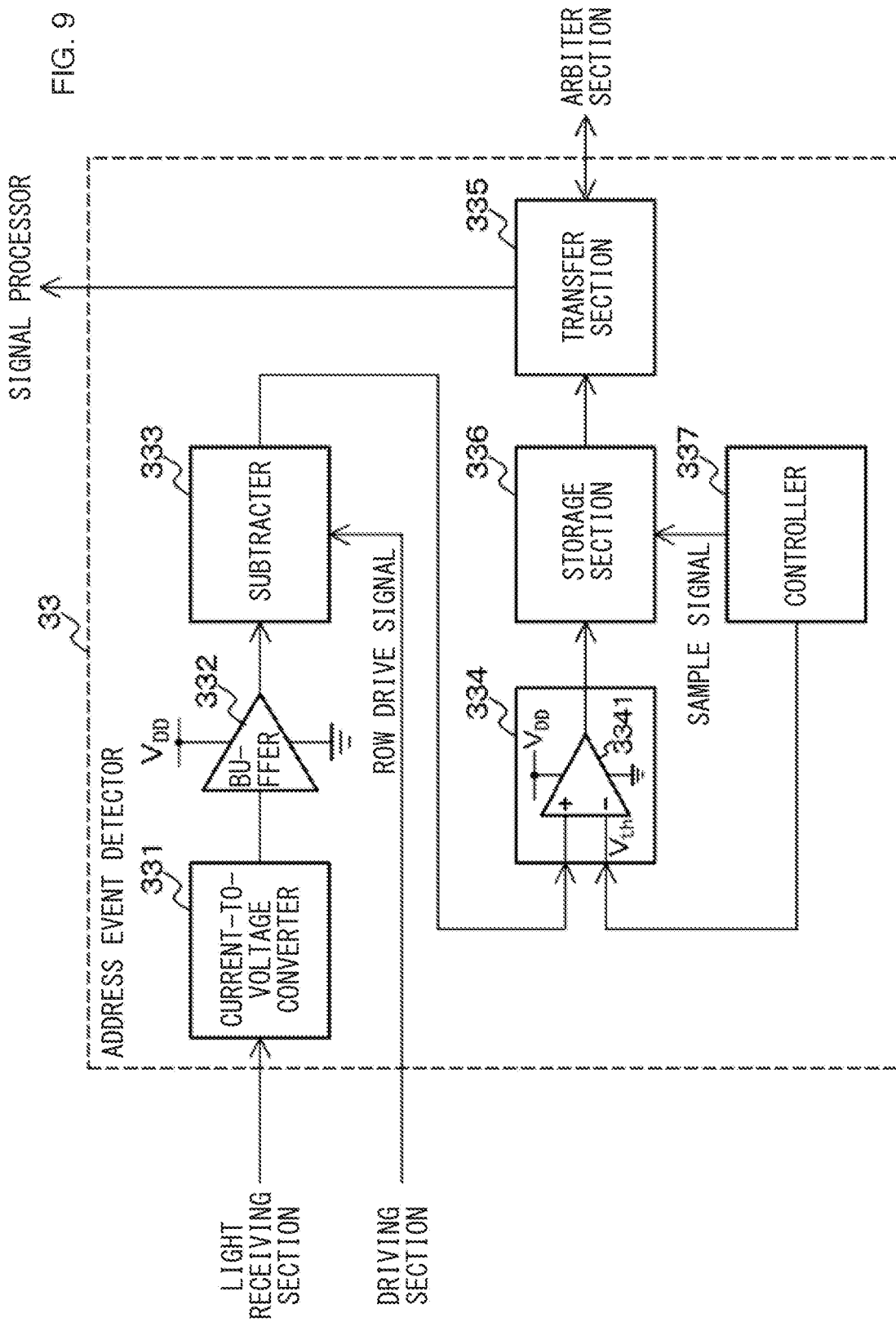
FIG. 9 is a block diagram illustrating a second configuration example of the address event detector in the event detection sensor according to the first configuration example.

FIG. 9 is a block diagram illustrating a second configuration example of the address event detector 33 in the event detection sensor 20 according to the first configuration example. As illustrated in FIG. 9, the address event detector 33 according to the second configuration example is configured to include a storage section 336 and a controller 337 in addition to the current-to-voltage converter 331, the buffer 332, the subtracter 333, the quantizer 334, and the transfer section 335.

The storage section 336 is provided between the quantizer 334 and the transfer section 335, and accumulates output of the quantizer 334, that is, a comparison result of the comparator 3341 on the basis of a sample signal supplied from the controller 337. The storage section 336 may be a sampling circuit such as a switch, plastic, and a capacitor, or may be a digital memory circuit such as a latch and a flip-flop.

The controller 337 supplies the predetermined threshold voltage $V_{th}$ to the inverted (−) input terminal of the comparator 3341. The threshold voltage $V_{th}$ supplied from the controller 337 to the comparator 3341 may have a voltage value that differs in a time division manner. For example, the controller 337 supplies a threshold voltage $V_{th1}$ corresponding to the on-event indicating that the amount of change of the photocurrent exceeds the upper threshold and a threshold voltage $V_{th2}$ corresponding to the off-event indicating that the amount of change of the photocurrent falls below the lower threshold at different timings, which makes it possible for one comparator 3341 to detect a plurality of types of address events.

The storage section 336 may accumulate the comparison result of the comparator 3341 using the threshold voltage $V_{th1}$ corresponding to the on-event in a period in which the threshold voltage $V_{th2}$ corresponding to the off-event is supplied from the controller 337 to the inverted (−) input terminal of the comparator 3341. It is to be noted that the storage section 336 may be provided inside the pixel 30, or may be provided outside the pixel 30. In addition, the storage section 336 is not an essential component of the address event detector 33. That is, the storage section 336 may not be included.

[Event Detection Sensor (Scan System) According to Second Configuration Example]

The event detection sensor 20 according to the first configuration example described above is an asynchronous event detection sensor that reads an event by an asynchronous reading system. However, the event reading system is not limited to the asynchronous reading system, and may be a synchronous reading system. The event detection sensor to which the synchronous reading system is applied is a scan system event detection sensor that is the same as a general imaging device that performs imaging at a predetermined frame rate.

Figure 10:
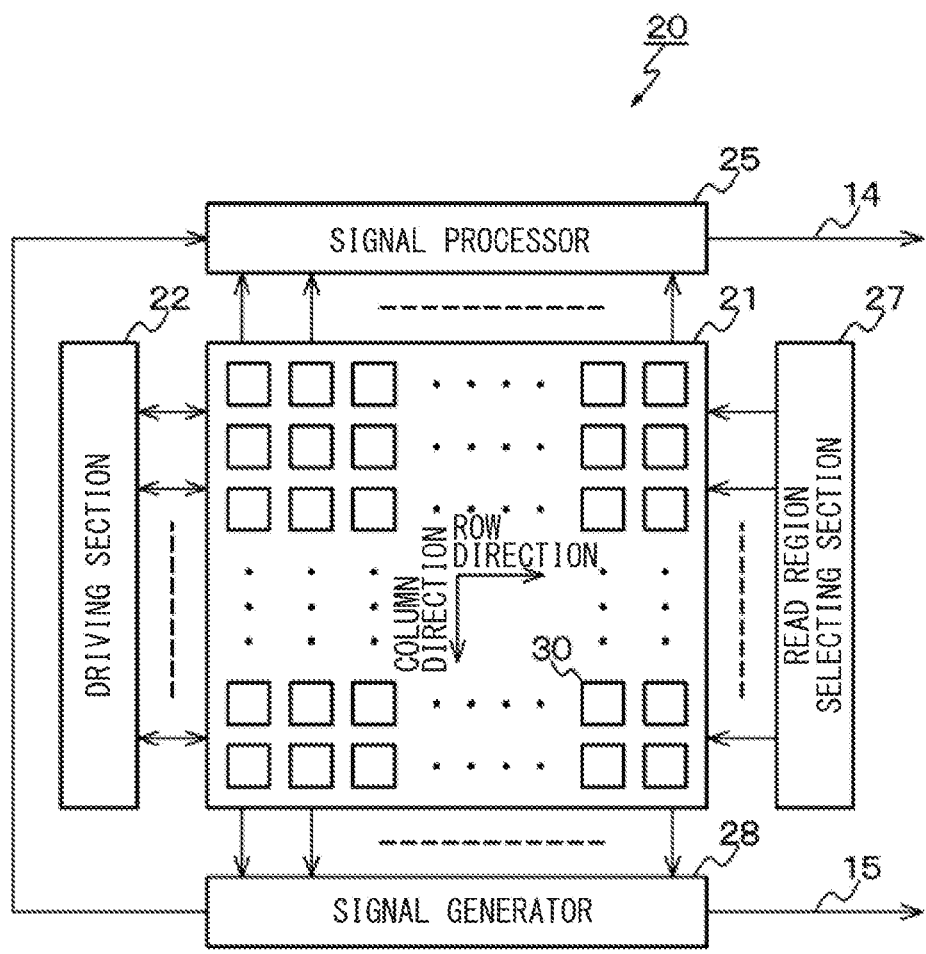
FIG. 10 is a block diagram illustrating an example of a configuration of the event detection sensor according to a second configuration example in the object recognition system to which the technology according to the present disclosure is applied.

FIG. 10 is a block diagram illustrating an example of a configuration of an event detection sensor according to a second configuration example, that is, a configuration of the scan system event detection sensor that is usable as the event detection sensor 20 in the object recognition system 1 to which the technology according to the present disclosure is applied.

As illustrated in FIG. 10, the event detection sensor 20 according to the second configuration example is configured to include the pixel array section 21, the driving section 22, the signal processor 25, a read region selecting section 27, and a signal generator 28.

The pixel array section 21 includes a plurality of pixels 30. The plurality of pixels 30 each outputs an output signal in response to a selection signal of the read region selecting section 27. Each of the plurality of pixels 30 may be configured to include a comparator in the pixel, for example, as illustrated in FIG. 8. The plurality of pixels 30 each outputs an output signal corresponding to the amount of change in intensity of light. The plurality of pixels 30 may be two-dimensionally arranged in a matrix as illustrated in FIG. 10.

The driving section 22 drives each of the plurality of pixels 30 to output a pixel signal generated by each of the pixels 30 to the signal processor 25. It is to be noted that the driving section 22 and the signal processor 25 are circuit portions for acquiring gray-scale information. Accordingly, in a case where only event information is acquired, the driving section 22 and the signal processor 25 may not be included.

The read region selecting section 27 selects some of the plurality of pixels 30 included in the pixel array section 21. Specifically, the read region selecting section 27 determines a selection region in response to a request from each of the pixels 30 of the pixel array section 21. For example, the read region selecting section 27 selects one or a plurality of rows from rows included in a two-dimensional matrix configuration corresponding to the pixel array section 21. The read region selecting section 27 sequentially selects one or a plurality of rows in accordance with a preset cycle.

The signal generator 28 generates an event signal corresponding to an active pixel in which an event has been detected among pixels selected by the read region selecting section 27 on the basis of the output signals of the selected pixels. The event is an event that intensity of light changes. The active pixel is a pixel in which the amount of change in intensity of light corresponding to the output signal exceeds or falls below a preset threshold. For example, the signal generator 28 compares the output signal of the pixel with a reference signal to detect an active pixel that outputs an output signal in a case where the output signal is greater or less than the reference signal, and generates an event signal corresponding to the active pixel.

The signal generator 28 may be configured to include, for example, a column selection circuit that arbitrates a signal entering the signal generator 28. In addition, the signal generator 28 may be configured to output not only information of the active pixel in which an event has been detected but also information of an inactive pixel in which no event has been detected.

The signal generator 28 outputs address information of the active pixel in which an event has been detected and time stamp information (e.g., (X, Y, T)) through an output line 15. However, data to be outputted from the signal generator 28 may include not only address information and time stamp information, but also a frame-format information (e.g., (0, 0, 1, 0 . . . )).

[Configuration Example of Chip Structure]

Figure 11:
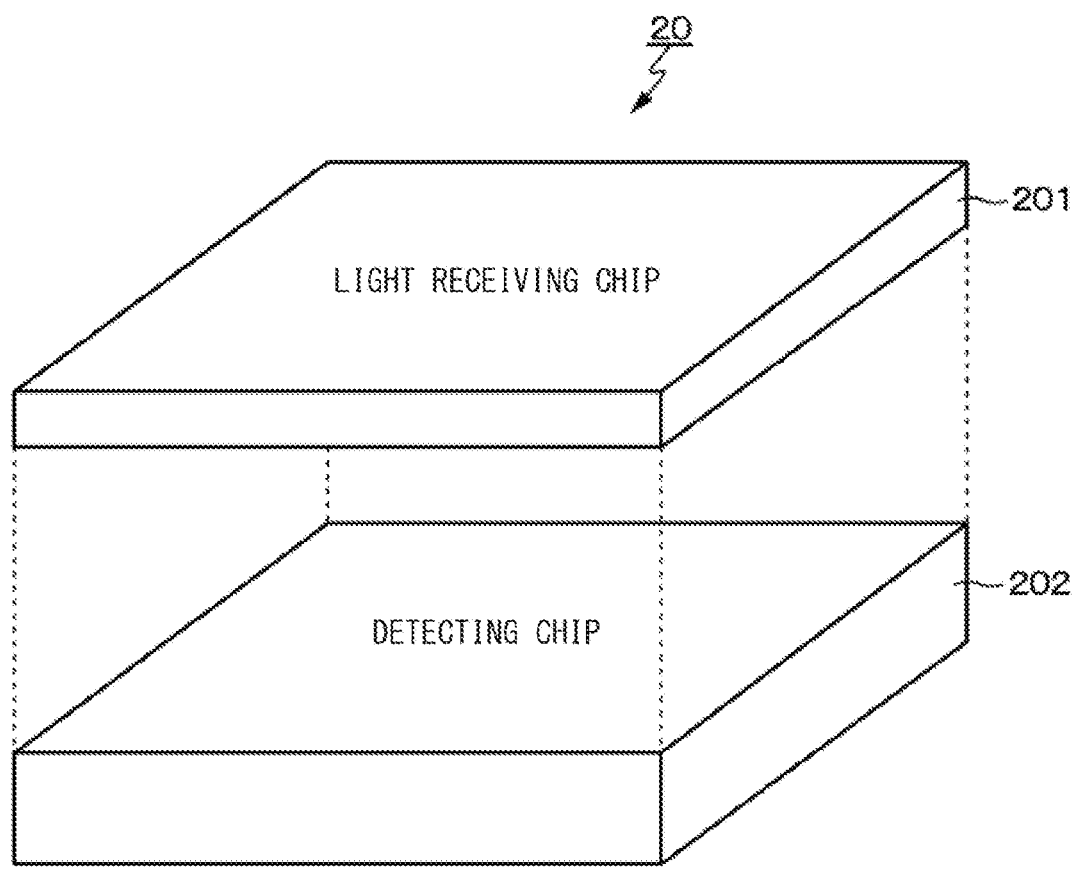
FIG. 11 is an exploded perspective view of an outline of a stacked chip structure of the event detection sensor in the object recognition system.

As a chip (semiconductor integrated circuit) structure of the event detection sensor 20 according to the first configuration example or the second configuration example described above, for example, a stacked chip structure may be adopted. FIG. 11 is an exploded perspective view of an outline of the stacked chip structure of the event detection sensor 20.

As illustrated in FIG. 11, the stacked chip structure, that is, a so-called stacked structure is a structure in which at least two chips including a light receiving chip 201 as a first chip and a detecting chip 202 as a second chip are stacked. Furthermore, in the circuit configuration of the pixel 30 illustrated in FIG. 5, each of the light receiving elements 311 is disposed on the light receiving chip 201, and all elements other than the light receiving element 311, elements of other circuit portions of the pixel 30, and the like are disposed on the detecting chip 202. The light receiving chip 201 and the detecting chip 202 are electrically coupled to each other through a coupling section such as a via (VIA), Cu—Cu bonding, and a bump.

It is to be noted that a configuration example is exemplified in which the light receiving element 311 is disposed on the light receiving chip 201 and elements other than the light receiving element 311, elements of other circuit portions of the pixel 30, and the like are disposed on the detecting chip 202; however, the configuration is not limited thereto.

For example, in the circuit configuration of the pixel 30 illustrated in FIG. 5, a configuration may be adopted in which each element of the light receiving section 31 is disposed on the light receiving chip 201 and elements other than the light receiving element 311, elements of other circuit portions of the pixel 30, and the like are disposed on the detecting chip 202. In addition, a configuration may be adopted in which each element of the light receiving section 31, the reset transistor 321 and the floating diffusion layer 324 of the pixel signal generator 32 are disposed on the light receiving chip 201 and other elements are disposed on the detecting chip 202. Furthermore, a configuration may be adopted in which some of elements included in the address event detector 33 are disposed together with each element of the light receiving section 31 and the like on the light receiving chip 201.

[About Noise Event]

Incidentally, in the object recognition system 1 of the structured light scheme, it is not that the event detection sensor 20 outputs, as event information, only event information (true event) derived from dot light having a predetermined pattern (hereinafter may be referred to as "dot pattern light") with which a subject is irradiated from the vertical cavity surface emitting laser 10.

As an example, defects such as flare tend to occur under the sun, or under high illumination light such as an event site and a baseball ballpark, and flare and the like may cause noise in a specific region or a wide region. Accordingly, in a later stage, processing is necessary to remove information other than event information, which is outputted from the event detection sensor and is derived from the dot pattern light with which the subject is irradiated from the light source section, that is, noise resulting from flare and the like, which places a burden on later signal processing.

<Object Recognition System According to Embodiment of Present Disclosure>

The object recognition system 1 according to the present embodiment of the present disclosure is able to remove information other than event information derived from dot pattern light (dot light having a predetermined pattern) with which a subject is irradiated from a surface-emitting semiconductor laser, e.g., the vertical cavity surface emitting laser 10 as a light source section, that is, noise resulting from flare and the like that occur under high illumination light, and reduce a burden on later signal processing.

The following description is given of a specific example of the present embodiment for removing, as a noise event, noise resulting from flare and the like that occur under high illumination light and outputting (reading) event information (true event) derived from dot pattern light with which a subject is irradiated from the vertical cavity surface emitting laser 10.

Example 1

Example 1 is an example in which noise resulting from flare and the like that occur under high illumination light is removed as a noise event (false event). In Example 1, in a case where in the pixel array section 21 of the event detection sensor 20, a plurality of successive pixels that is equal to or greater than a predetermined number of pixels detects the occurrence of an event in a certain period, this event is removed as a noise event (false event), and event information derived from dot pattern light with which a subject is irradiated from the vertical cavity surface emitting laser 10 is read as a true event.

Figure 12:
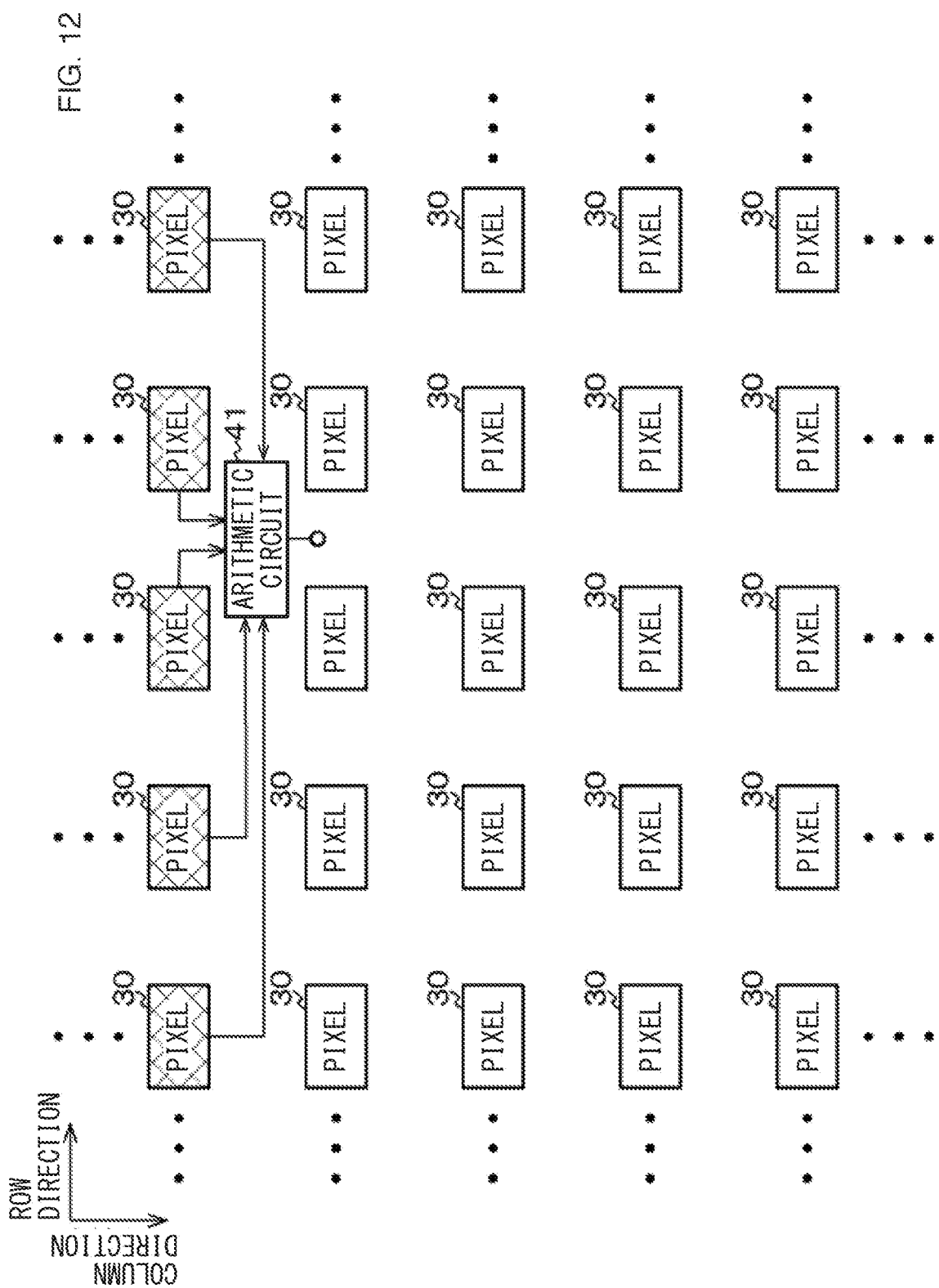
FIG. 12 is a block diagram illustrating an example of a circuit configuration for implementing signal processing according to Example 1, and illustrates a configuration in which five successive pixels in a row direction are regarded as a unit that detects a noise event.

Signal processing according to Example 1 is executed as one of signal processing of the signal processor 60 illustrated in FIG. 1B. Accordingly, the signal processor 60 has a filtering function of removing, as a noise event, noise resulting from flare and the like that occur under high illumination light. FIG. 12 illustrates an example of a circuit configuration for implementing the signal processing according to Example 1.

As illustrated in FIG. 12, in the signal processing according to Example 1, a configuration is adopted in which in the pixel array section 21 of the event detection sensor 20, that is, a pixel arrangement in a matrix form, for example, five successive pixels in a row direction is regarded as a unit in which noise resulting from flare and the like that occur under high illumination light is detected as a noise event, and an arithmetic circuit 41 is included for each of the units. The arithmetic circuit 41 detects that an event has occurred in a certain period in five successive pixels 30 in the same row. In response to a detection result of the arithmetic circuit 41, the signal processor 60 performs processing of removing the event that has occurred in the five successive pixels in the row direction as a noise event resulting from flare and the like that occur under high illumination light.

It is to be noted that, five successive pixels in one pixel row here are regarded as a unit that detects a noise event; however, the unit is not limited to five pixels, and may include four successive pixels or six or more successive pixels, or the unit is not limited to one pixel row, and may be a group of successive pixels in a plurality of rows in the row direction.

In addition, the configuration is not limited to a configuration in which in the pixel arrangement in a matrix form, successive pixels in the row direction are regarded as the unit, but a configuration may be adopted in which successive pixels in a column direction are regarded as the unit as illustrated in FIG. 13. Even in this case, the number of successive pixels is not limited to five pixels, and the unit is not limited to one pixel column, and may be a group of successive pixels in a plurality of columns in the column direction. In addition, as illustrated in FIG. 14, a configuration may be adopted in which a group of successive pixels in a diagonal direction is regarded as the unit. Furthermore, a configuration may be adopted in which a group of successive pixels in the row direction, the column direction, and the diagonal direction is regarded as the unit. That is, in the pixel array section 21 of the event detection sensor 20, it is sufficient if a group of successive pixels in at least one direction of the row direction, the column direction, or the diagonal direction is regarded as the unit.

As described above, according to the signal processing according to Example 1, it is possible to remove a noise event resulting from flare and the like that occur under high illumination light and read, as a true event, event information derived from dot pattern light with which a subject is irradiated from the vertical cavity surface emitting laser 10, which makes it possible to reduce a burden on later signal processing.

Figure 15A:
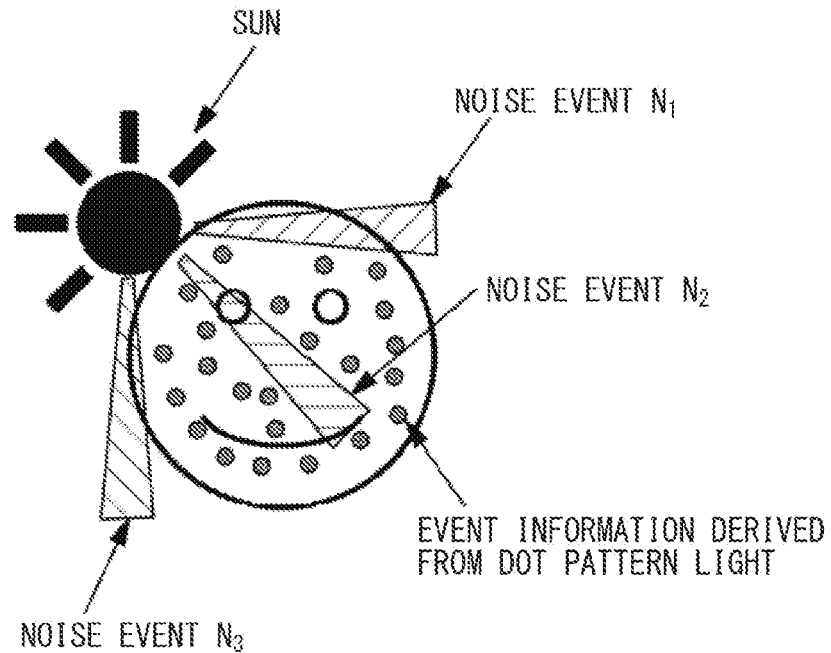
FIG. 15A is a diagram schematically illustrating noise events $N_1$ to $N_3$ resulting from flare and the like in a case where the sun is in a background.

FIG. 15A schematically illustrates noise events $N_1$ to $N_3$ resulting from flare and the like in a case where the sun is in a background. The noise event $N_1$ that occurs linearly in the row direction is detectable by a group of successive pixels in the row direction illustrated in FIG. 12. The noise event $N_2$ that occurs linearly in the diagonal direction is detectable by a group of successive pixels in the diagonal direction illustrated in FIG. 14. The noise event $N_3$ that occurs linearly in the column direction is detectable by a group of successive pixels in the row direction illustrated in FIG. 13 Accordingly, a configuration is preferable in which pixels are successive in the row direction, the column direction, and the diagonal direction in order to detect noise events that occur linearly (in a linear form) in all directions.

It is to be noted that here, whether the event information is true or false is determined with use of the arithmetic circuit 41 by hardware, which is only one example, and such determination is not limited to determination by signal processing using the arithmetic circuit 41. For example, it is possible to determine whether the event information is true or false by software in a cycle of a certain period by storing event information outputted from each pixel 30 of the event detection sensor 20 in a certain period.

Figure 15B:
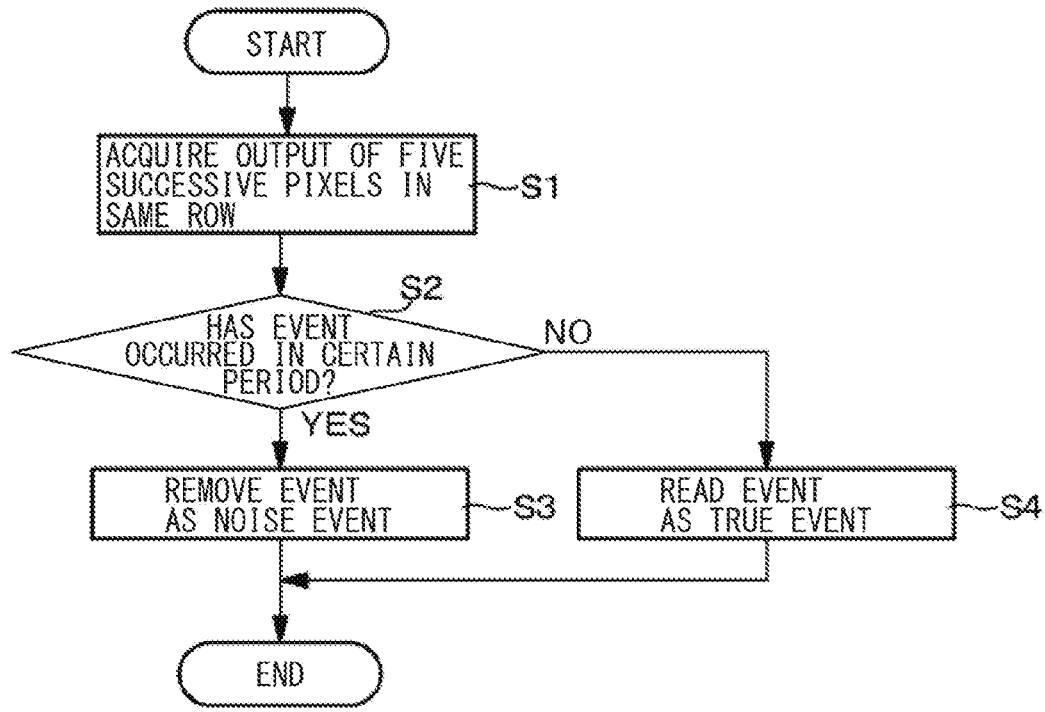
FIG. 15B is a flowchart illustrating an example of a signal processing method of the object recognition system of the present disclosure.

A flowchart in FIG. 15B illustrates an example of a signal processing method of an object recognition system of the present disclosure that is executed by software. In the signal processor 60, output of five successive pixels 30 in the same row is first acquired (step S1), and then whether or not an event has occurred in a certain period is determined (step S2). Thereafter, in a case where the event has occurred in the certain period (YES in S2), the event is removed as a noise event (step S3), and in a case where the event has not occurred in the certain period (NO in S2), the event is read as event information (true event) derived from dot pattern light with which a subject is irradiated (step S4).

In addition, in the signal processing according to Example 1, it is assumed that the noise events $N_1$ to $N_3$ resulting from flare and the like occur linearly (in a linear form), and a configuration is adopted in which groups of pixels that detect the noise events are provided linearly in the row direction, the column direction, or the diagonal direction; however, a configuration may be adopted in which the shapes of the noise events resulting from flare and the like are learned by machine learning and groups of successive pixels are provided corresponding to a learning result.

Example 2

Example 2 is an example in which a lower threshold and an upper threshold are set for detecting a true event derived from dot pattern light with which a subject is irradiated.

The noise event is considered to occur independently in each pixel. In contrast, a moving object has a certain size. For this reason, event information derived from dot pattern light with which a subject is irradiated from the vertical cavity surface emitting laser 10 occurs over pixels in a certain region.

Accordingly, in Example 2, in the event detection sensor 20, a lower threshold and an upper threshold are set as thresholds for detecting a true event derived from dot pattern light with which a subject is irradiated. Specifically, assuming that a distance to the subject (that is, a distance between the subject and the event detection sensor 20) is a predetermined distance, for example, two horizontal pixels×two vertical pixels=four mutually adjacent pixels in total (first number of pixels) is a lower threshold for true event detection. In addition, for example, four horizontal pixels×four vertical pixels=sixteen mutually adjacent pixels in total (second number of pixels) that is greater than the first number of pixels is an upper threshold for true event detection.

Here, for example, in a case where it is assumed that the object recognition system 1 according to the present embodiment is used as a face authentication system mounted on a smartphone, an average distance between the smartphone and a person who holds the smartphone may be exemplified as the "predetermined distance".

Figure 16:
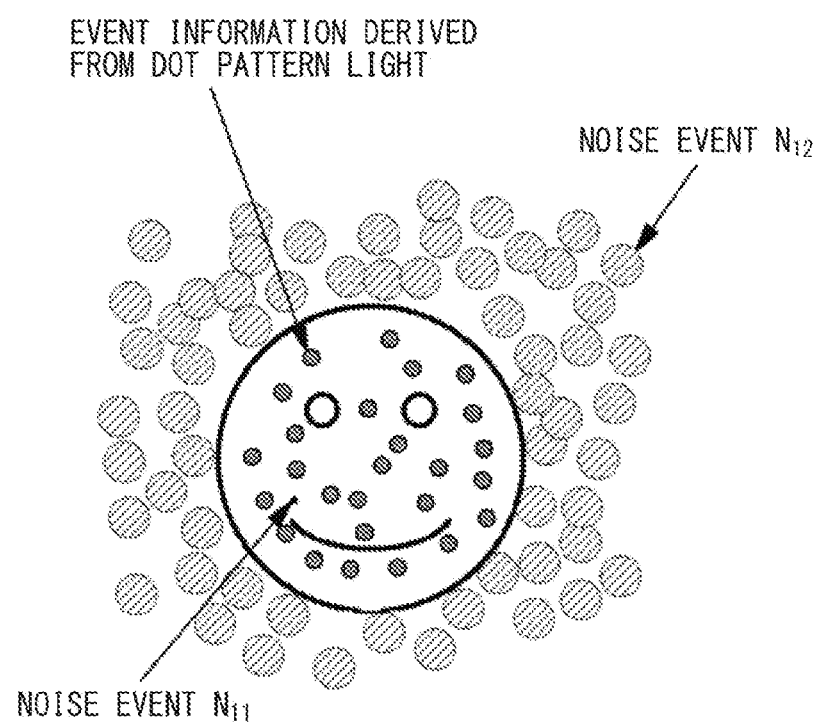
FIG. 16 is a diagram schematically illustrating an extremely small noise event $N_{11}$ such as sensor noise and a large-sized noise event $N_1$ based on a light spot reflected by a background behind a face.

Furthermore, in a case where pixels equal to or greater than the lower threshold (the first number of pixels) and equal to or less than the upper threshold (the second number of pixels), e.g., three horizontal pixels×three vertical pixels=nine mutually adjacent pixels in total detect an event in a certain period, the event is read as event information derived from dot pattern light with which the subject is irradiated, that is, a true event. Examples of the noise event may include an extremely small noise event $N_{11}$ resulting from sensor noise and the like, and a large-sized noise event $N_{12}$ based on a light spot reflected by a background behind a face as illustrated in FIG. 16, in addition to a linear noise event resulting from flare and the like.

According to the signal processing according to Example 2, setting the lower threshold and the upper threshold for detecting a true event derived from dot pattern light with which a subject is irradiated makes it possible to reliably remove, for example, the noise event $N_{11}$, which is less than the lower threshold, resulting from sensor noise and the like and the noise event $N_{12}$, which is greater than the upper threshold. Furthermore, it is possible to read event information that is equal to or greater than the lower threshold and equal to or less than the upper threshold, as event information derived from dot pattern light with which a subject is irradiated, that is, a true event.

Example 3

Example 3 is an example in which a lower threshold and an upper threshold of the number of pixels for detecting a true event are changed in accordance with a distance to a subject (that is, a distance between the subject and the event detection sensor 20).

The object recognition system 1 according to the present embodiment uses the technology of the structured light scheme; therefore, the signal processor 60 illustrated in FIG. 1B has a function of measuring a distance to a subject. Using such a distance measurement function makes it possible to measure a distance between the subject and the event detection sensor 20.

However, measurement of the distance between the subject and the event detection sensor 20 is not limited to measurement using the distance measurement function of the signal processor 60, and for example, a proximity sensor such as a ToF (Time of Flight: time of flight of light) sensor may also be used.

Figure 17A:
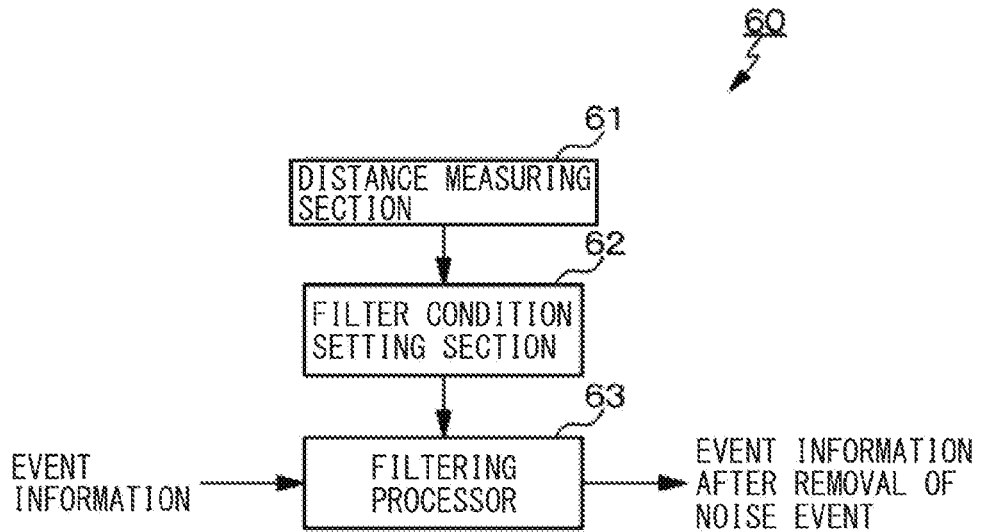
FIG. 17A is a functional block diagram of a signal processor for implementing signal processing according to Example 3.
Figure 17B:
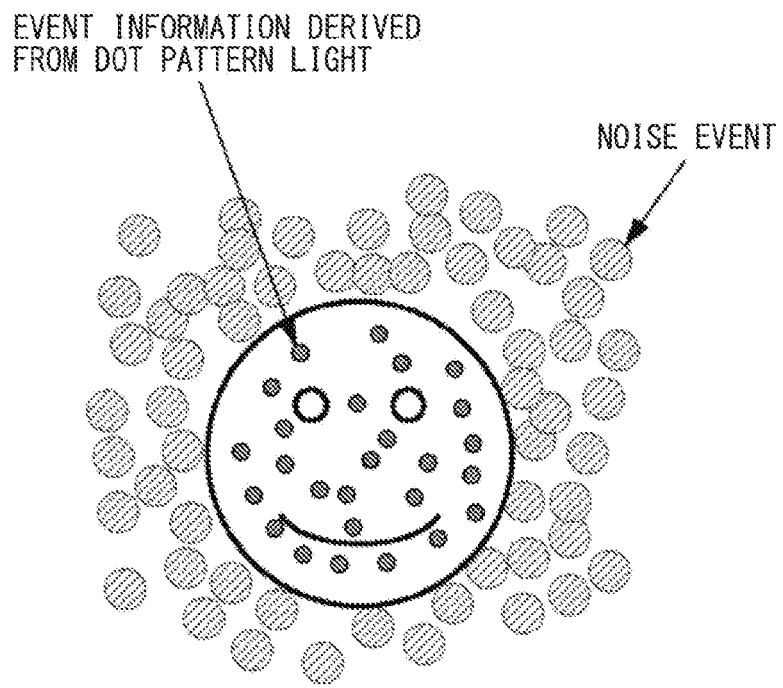
FIG. 17B is a conceptual diagram illustrating a difference in size of spot light entering the event detection sensor with a difference in distance to a subject.

FIG. 17A illustrates a functional block diagram of the signal processor 60 for implementing signal processing according to Example 3, and FIG. 17B illustrates a conceptual diagram illustrating a difference in size (size) of spot light entering the event detection sensor 20 with a difference in distance to a subject.

Dot pattern light with which the subject is irradiated from the vertical cavity surface emitting laser 10 is reflected by the subject, and the size (size) of spot light entering the event detection sensor 20 relatively becomes smaller with decreasing distance to the subject and relatively becomes larger with increasing distance to the subject.

As an example, in a case where it is assumed that the object recognition system 1 according to the present embodiment is used as a face authentication system mounted on a smartphone, as illustrated in FIG. 17B, the size of a light spot reflected by a human face close to the smartphone is relatively small, and the size of a light spot reflected by a background behind the face is relatively large. Thus, the size of a light spot that is reflected by an object irradiated with dot pattern light to enter the event detection sensor 20 differs depending on a distance from the object recognition system 1 to the irradiated object.

In contrast, a distance to a subject, that is, a distance between the subject and the event detection sensor 20 is not limited to a constant distance, and differs depending on a person who uses the smartphone, for example. Accordingly, in the signal processing according to Example 3, the lower threshold and the upper threshold for detecting a true event are changed in accordance with the distance to the subject. The lower threshold and the upper threshold may be filter conditions in filtering processing in the signal processor 60.

As illustrated in FIG. 17A, a functional section of the signal processor 60 for executing the signal processing according to Example 3 includes a distance measuring section 61, a filter condition setting section 62, and a filtering processor 63.

The distance measuring section 61 includes the distance measurement function of the object recognition system 1 or a proximity sensor such as a ToF sensor, and measures a distance to a subject, that is, a distance between the subject and the event detection sensor 20.

The filter condition setting section 62 detects, as a true event, the filter conditions, that is, event information derived from dot pattern light with which the subject is irradiated, on the basis of a measurement result of the distance measuring section 61, and sets the lower threshold and the upper threshold for removing a noise event.

The filtering processor 63 performs filtering processing of reading, as the true event, the event information derived from the dot pattern light on the basis of the filter conditions set by the filter condition setting section 62 and removing other information as a noise event.

As described above, in the signal processing according to Example 3, the lower threshold and the upper threshold are changed in accordance with the distance to the subject (that is, the distance between the subject and the event detection sensor 20). Thus, even if the distance to the subject is changed, it is possible to reliably read event information derived from dot pattern light as a true event and reliably remove other information as a noise event.

It is to be noted that here, the distance to the subject is measured with use of the distance measurement function of the object recognition system 1 or the proximity sensor such as a ToF sensor; however, in a case where the object recognition system 1 is mounted on a smartphone, it is possible to know a rough distance to a face by an average size of a human face without directly measuring the distance.

Thus, it is possible to detect the shape of a face on the basis of output of the event detection sensor 20 and set the filter conditions on the basis of the outline size of the face.

Example 4

Example 4 is a processing example for face authentication in a case where the object recognition system 1 is applied to, for example, face authentication.

Figure 18:
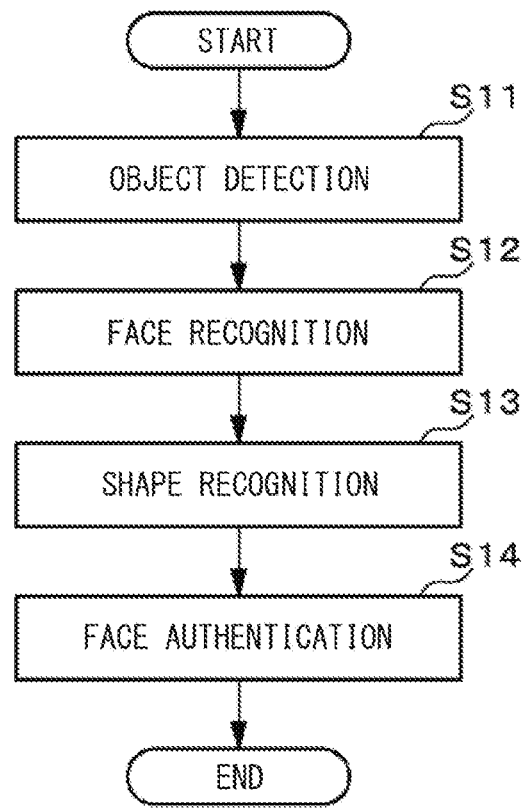
FIG. 18 is a flowchart illustrating an example of signal processing according to Example 4.

FIG. 18 is a flowchart illustrating an example of signal processing according to Example 4, that is, processing for face authentication. In a case where the function of the system controller 100 illustrated in FIG. 1B is implemented by a processor, this processing is executed in the signal processor 60 under control by a processor included in the system controller 100.

The processor included in the system controller 100 (hereinafter simply referred to as "processor") performs object detection at a specific position, that is, detection of a human face in this example with use of the vertical cavity surface emitting laser 10 and the event detection sensor 20 (step S11).

In processing of this object detection, the human face is present in a limited region within a shooting range; therefore, in the vertical cavity surface emitting laser 10, only the point light sources 11 in a specific region of a pixel array are operated. In response to this, even in the event detection sensor 20, only pixels 30 including the light receiving elements 311 in a specific region of the pixel array are operated.

Partially operating the vertical cavity surface emitting laser 10 and the event detection sensor 20 in such a manner makes it possible to perform distance measurement upon object detection with low power consumption. It is to be noted that the operation of the event detection sensor 20 with low power consumption is achievable by on/off control of a power supply for each of the pixels 30.

The object detection with use of the vertical cavity surface emitting laser 10 and the event detection sensor 20 is achievable by using, for example, a known triangulation system in which a distance to a subject is measured with use of a triangulation method.

Next, the processor performs recognition processing of a feature of a face detected by object detection (step S12). In this face recognition processing, in the vertical cavity surface emitting laser 10, partial irradiation is not performed, and the point light sources 11 in a wide-angle region are operated. In contrast, in the event detection sensor 20, the pixels 30 including the light receiving elements 311 in a specific region of interest, that is, a ROI (Region Of Interest) region are operated. Then, in the face recognition processing, in the event detection sensor 20, a gray-scale reading operation using the pixel signal generator 32 illustrated in FIG. 5 is performed. This gray-scale reading operation makes it possible to acquire a high-resolution image.

As described above, in the face recognition processing in the step S12, a high-resolution image of the face detected by the object detection is acquired by the wide-angle irradiation by the vertical cavity surface emitting laser 10 and the gray-scale reading operation by the event detection sensor 20. Then, a feature point of the face, and the like are extracted for face authentication on the basis of the high-resolution image.

For this face recognition, it is possible to use a pattern recognition technology by machine learning such as a neural network, e.g., a technology in which recognition processing is performed by comparing a feature point of a face supplied as teacher data with a feature point of a captured face image.

Next, the processor performs shape recognition of the recognized face (step S13). In this shape recognition processing, the shape recognition of the face is performed by a distance measurement system using the structured light scheme. Specifically, in the vertical cavity surface emitting laser 10 that enables control of light emission/non-light emission in pixel units, the recognized face is irradiated with light having a time-series pattern by dot irradiation, line irradiation, or the like.

In contrast, in the event detection sensor 20, event data outputted from the address event detector 33 illustrated in FIG. 6 or FIG. 9 is used. The event data includes a time stamp that is time information indicating a relative time at which the event occurred. It is possible to specify a occurrence point of the event on the basis of the time stamp (time information).

As described above, in the shape recognition processing in the step S13, shape recognition of the face is performed by highly accurate matching in a spatial direction in a time series by the vertical cavity surface emitting laser 10 that enables control of light emission/non-light emission in pixel units and the event detection sensor 20 that reads the occurrence point of the event from the time stamp (time information).

Finally, the processor performs authentication of the face of which the shape has been recognized, with use of a known face authentication technology (step S14). Examples of the known face authentication technology may include a technology in which face authentication is performed by extracting a plurality of feature points of a face image of the recognized face and matching up the plurality of feature points with feature points that have been already registered.

The signal processing according to Example 4 described above is processing for face authentication by the object recognition system 1 that includes a combination of the vertical cavity surface emitting laser 10 and the event detection sensor 20 and uses the technology of the structured light scheme. In this object recognition system 1, it is possible to remove the noise event and read only event information derived from dot pattern light with which a face is irradiated. Thus, according to the signal processing according to Example 4, it is possible to perform face authentication processing more reliably.

MODIFICATION EXAMPLES

Although the technology of the present disclosure has been described with reference to preferred embodiments, the technology of the present disclosure is not limited to the embodiments. The configurations and structures of the object recognition system described in the above embodiments are illustrative, and may be appropriately modified.

APPLICATION EXAMPLES

The object recognition system of the present disclosure described above is usable, for example, as a face authentication system to be mounted to any of various electronic apparatuses having a face authentication function. Examples of the electronic apparatuses having the face authentication function may include mobile apparatuses such as a smartphone, a tablet, and a personal computer.

However, as an apparatus (system) that is able to use the object recognition system of the present disclosure as the face authentication system is not limited to the mobile apparatuses, and examples thereof may include a security system, an automobile, and the like that release a door lock by face authentication, in addition to the mobile apparatuses.

<Electronic Apparatus of Present Disclosure>

Figure 19:
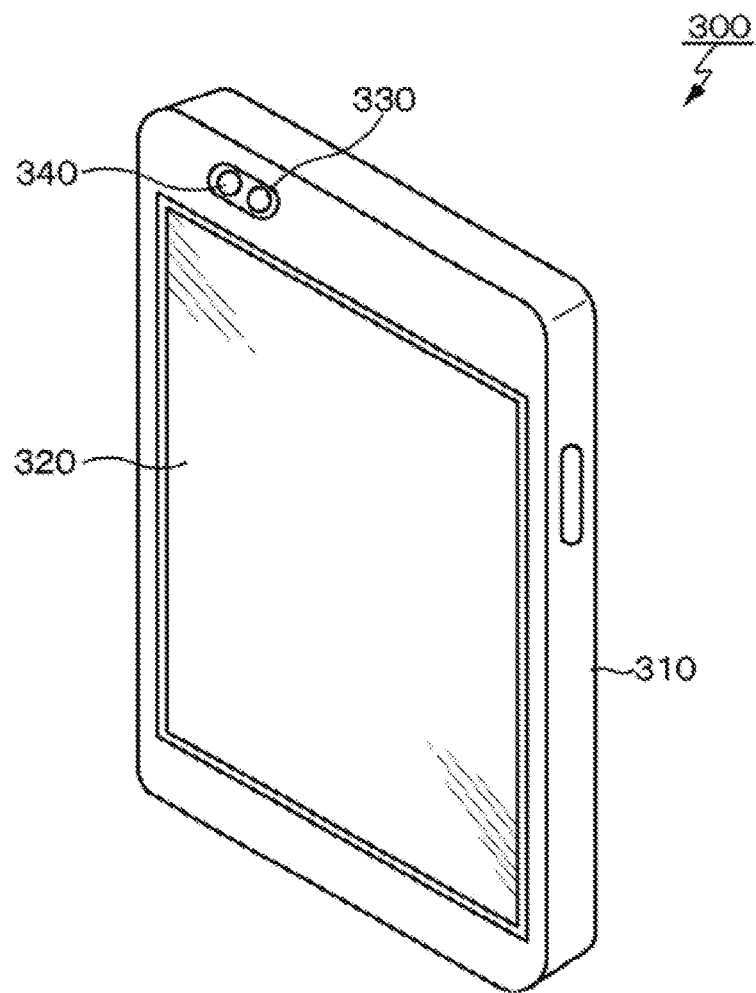
FIG. 19 is an external view of a smartphone as an example of an electronic apparatus of the present disclosure as viewed from front side.

Here, an example of the electronic apparatus of the present disclosure that is able to use the object recognition system of the present disclosure is a smartphone. FIG. 19 illustrates an external view of a smartphone including the object recognition system according to the embodiment described above as a face authentication system as viewed from front side.

A smartphone 300 according to this example includes a display section 320 on front side of a housing 310. Further, the smartphone 300 including the object recognition system according to the embodiment described above as a face authentication system includes a light emitting section 330 and a light receiving section 340 in an upper section on the front side of the housing 310. It is to be noted that a disposition example of the light emitting section 330 and the light receiving section 340 illustrated in FIG. 19 is only an example, and disposition of the light emitting section 330 and the light receiving section 340 is not limited thereto.

In the smartphone 300 that is an example of the mobile apparatus having the configuration described above, it is possible to use, as the light emitting section 330, the vertical cavity surface emitting laser (VCSEL) 10 in the object recognition system 1 described above, and use, as the light receiving section 340, the event detection sensor (DVS) 20 in the object recognition system 1. That is, the smartphone 300 according to this example is fabricated as a smartphone having a face authentication function with use of the object recognition system 1 according to the embodiment described above.

<Possible Configurations of Present Disclosure>

It is to be noted that the present disclosure may also have the following configurations.

<<A. Object Recognition System>>

[A-1]

An object recognition system including:
a light source section that irradiates a subject with dot light having a predetermined pattern;
an event detection sensor that receives the dot light having the predetermined pattern reflected by the subject and detects, as an event, that a change in luminance of a pixel exceeds a predetermined threshold; and
a signal processor that performs, in a case where a plurality of successive pixels in a pixel array section of the event detection sensor detects occurrence of an event in a certain period, processing of removing the event as noise, the plurality of successive pixels being equal to or greater than a predetermined number of pixels.

[A-2]

The object recognition system according to [A-1], in which the plurality of pixels includes a group of successive pixels in at least one direction of a row direction, a column direction, or a diagonal direction in the pixel array section of the event detection sensor.

[A-3]

The object recognition system according to [A-2], in which assuming that in the event detection sensor, a first number of mutually adjacent pixels is a lower threshold and a second number of mutually adjacent pixels that is greater than the first number of pixels is an upper threshold,
in a case where each of mutually adjacent pixels of which number is equal to or greater than the first number of pixels and equal to or less than the second number of pixels detects occurrence of an event in the certain period, the signal processor reads the event as event information derived from the dot light having the predetermined pattern.

[A-4]

The object recognition system according to [A-3], in which in a case where pixels of which number is less than the first number of pixels detect occurrence of an event, the signal processor removes the event as noise.

[A-5]

The object recognition system according to [A-3] or [A-4], in which the signal processor changes each of a lower threshold and a upper threshold of the number of pixels in accordance with a distance to the subject.

[A-6]

The object recognition system according to [A-5], in which the signal processor has a distance measurement function of measuring the distance to the subject, and measures the distance to the subject by this distance measurement function.

[A-7]

The object recognition system according to [A-5], in which the distance to the subject is measured with use of a proximity sensor.

[A-8]

The object recognition system according to any one of [A-1] to [A-7], in which the light source section includes a surface-emitting semiconductor laser.

[A-9]

The object recognition system according to [A-8], in which the surface-emitting semiconductor laser includes a vertical cavity surface emitting laser.

[A-10]

The object recognition system according to any one of [A-1] to [A-9], in which the object recognition system is used for face authentication in a case where the subject is a human face.

[A-11]

The object recognition system according to [A-10], in which in face authentication processing, face detection at a specific position is performed with use of a vertical cavity surface emitting laser as the light source section and the event detection sensor, recognition processing of a feature of the detected face is then performed, shape recognition of the recognized face is then performed, and authentication processing of the face of which the shape has been recognized is finally performed.

<<B. Electronic Apparatus>>

[B-1]

An electronic apparatus provided with an object recognition system, the face object recognition system including:
   a light source section that irradiates a subject with dot light having a predetermined pattern;
   an event detection sensor that receives the dot light having the predetermined pattern reflected by the subject and detects, as an event, that a change in luminance of a pixel exceeds a predetermined threshold; and
   a signal processor that performs, in a case where a plurality of successive pixels in a pixel array section of the event detection sensor detects occurrence of an event in a certain period, processing of removing the event as noise, the plurality of successive pixels being equal to or greater than a predetermined number of pixels.

[B-2]

The electronic apparatus according to [B-1], in which the plurality of pixels includes a group of successive pixels in at least one direction of a row direction, a column direction, or a diagonal direction in the pixel array section of the event detection sensor.

[B-3]

The electronic apparatus according to [B-2], in which
   assuming that in the event detection sensor, a first number of mutually adjacent pixels is a lower threshold and a second number of mutually adjacent pixels that is greater than the first number of pixels is an upper threshold,
   in a case where each of mutually adjacent pixels of which number is equal to or greater than the first number of pixels and equal to or less than the second number of pixels detects occurrence of an event in the certain period, the signal processor reads the event as event information derived from the dot light having the predetermined pattern.

[B-4]

The electronic apparatus according to [B-3], in which in a case where pixels of which number is less than the first number of pixels detect occurrence of an event, the signal processor removes the event as noise.

[B-5]

The electronic apparatus according to [B-3] or [B-4], in which the signal processor changes each of a lower threshold and a upper threshold of the number of pixels in accordance with a distance to the subject.

[B-6]

The electronic apparatus according to [B-5], in which the signal processor has a distance measurement function of measuring the distance to the subject, and measures the distance to the subject by this distance measurement function.

[B-7]

The electronic apparatus according to [B-5], in which the distance to the subject is measured with use of a proximity sensor.

[B-8]

The electronic apparatus according to any one of [B-1] to [B-7], in which the light source section includes a surface-emitting semiconductor laser.

[B-9]

The electronic apparatus according to [B-8], in which the surface-emitting semiconductor laser includes a vertical cavity surface emitting laser.

[B-10]

The electronic apparatus according to any one of [B-1] to [B-9], in which the object recognition system is used for face authentication in a case where the subject is a human face.

[B-11]

The electronic apparatus according to [B-10], in which in face authentication processing, face detection at a specific position is performed with use of a vertical cavity surface emitting laser as the light source section and the event detection sensor, recognition processing of a feature of the detected face is then performed, shape recognition of the recognized face is then performed, and authentication processing of the face of which the shape has been recognized is finally performed.

REFERENCE SIGNS LIST

1: object recognition system
10: vertical cavity surface emitting laser (VCSEL)
11: point light source
20: event detection sensor (DVS)
21: pixel array section
22: driving section
23: arbiter section (arbitration section)
24: column processor
25: signal processor
30: pixel
40: light source driving section
50: sensor controller
60: signal processor
61: distance measuring section
62: filter condition setting section
63: filtering processor

The invention claimed is:
1. An object recognition system comprising:
   a light source section that irradiates a subject with dot light having a predetermined pattern;
   an event detection sensor including a pixel array that includes a plurality of pixels, the event detection sensor being configured to receive the dot light having the predetermined pattern as reflected by the subject and to detect pixel events when respective changes in luminance of respective pixels exceeds a predetermined threshold; and a signal processor configured to detect a noise event when the pixel events are detected for a first group of linearly successive pixels in the pixel array having a number that is equal to or greater than a first threshold number within a predetermined period of time, and to remove the noise event.

2. The object recognition system according to claim 1, wherein the linearly successive pixels extend in a row direction, a column direction, or a diagonal direction in the pixel array.

3. The object recognition system according to claim 1, wherein the signal processor is configured to detect a true event as event information derived from the dot light having the predetermined pattern when the pixel events are detected for a second group of mutually adjacent pixels in the pixel array having a number that is greater than or equal to a second threshold number and less than or equal to a third threshold number, the second group of mutually adjacent pixels having adjacency in at least two directions.

4. The object recognition system according to claim 3, wherein the signal processor is configured to change at least one of the first, second or third threshold numbers in accordance with a distance to the subject.

5. The object recognition system according to claim 4, wherein the signal processor is configured to perform a distance measurement function for measuring the distance to the subject.

6. The object recognition system according to claim 4, wherein the distance to the subject is measured with use of a proximity sensor.

7. The object recognition system according to claim 1, wherein the light source section includes a surface-emitting semiconductor laser.

8. The object recognition system according to claim 7, wherein the surface-emitting semiconductor laser comprises a vertical cavity surface emitting laser.

9. The object recognition system according to claim 1, wherein the signal processor is configured to perform face authentication in a case where the subject is a human face.

10. The object recognition system according to claim 9, wherein the face authentication includes face detection at a specific position using a vertical cavity surface emitting laser as the light source section and the event detection sensor, then recognition processing of a feature of the detected face, then shape recognition of the recognized face is then performed, and then authentication processing of the face from which the shape has been recognized.

11. A signal processing method of an object recognition system, the method comprising:
    causing a light source section to irradiate a subject with dot light having a predetermined pattern;
    receiving, by an event detection sensor including a pixel array that includes a plurality of pixels, the dot light having the predetermined pattern as reflected by the subject;
    detecting pixel events when respective changes in luminance of respective pixels exceeds a predetermined threshold;
    detecting a noise event when the pixel events are detected for a first group of linearly successive pixels in the pixel array having a number that is equal to or greater than a first threshold number within a predetermined period of time; and
    removing the noise event.

12. An electronic apparatus comprising the object recognition system according to claim 1.

13. The method according to claim 11, wherein the linearly successive pixels extend in a row direction, a column direction, or a diagonal direction in the pixel array.

14. The method according to claim 11, further comprising:
    detecting a true event as event information derived from the dot light having the predetermined pattern when the pixel events are detected for a second group of mutually adjacent pixels in the pixel array having a number that is greater than or equal to a second threshold number and less than or equal to a third threshold number, the second group of mutually adjacent pixels having adjacency in at least two directions.

15. The method according to claim 14, further comprising:
    changing at least one of the first, second or third threshold numbers in accordance with a distance to the subject.

16. A non-transitory computer readable medium storing program code, the program code being executable by a processor to perform operations comprising:
    causing a light source section to irradiate a subject with dot light having a predetermined pattern;
    receiving, by an event detection sensor including a pixel array that includes a plurality of pixels, the dot light having the predetermined pattern as reflected by the subject;
    detecting pixel events when respective changes in luminance of respective pixels exceeds a predetermined threshold;
    detecting a noise event when the pixel events are detected for a first group of linearly successive pixels in the pixel array having a number that is equal to or greater than a first threshold number within a predetermined period of time; and
    removing the noise event.

17. The non-transitory computer readable medium according to claim 16, wherein the linearly successive pixels extend in a row direction, a column direction, or a diagonal direction in the pixel array.

18. The non-transitory computer readable medium according to claim 16, wherein the operations further comprise:
    detecting a true event as event information derived from the dot light having the predetermined pattern when the pixel events are detected for a second group of mutually adjacent pixels in the pixel array having a number that is greater than or equal to a second threshold number and less than or equal to a third threshold number, the second group of mutually adjacent pixels having adjacency in at least two directions.

19. The non-transitory computer readable medium according to claim 18, wherein the operations further comprise:
    changing at least one of the first, second or third threshold numbers in accordance with a distance to the subject.

* * * * *